United States Patent
Oka et al.

(10) Patent No.: US 8,909,581 B2
(45) Date of Patent: Dec. 9, 2014

(54) FACTOR-GRAPH BASED MATCHING SYSTEMS AND METHODS

(75) Inventors: Anand Ravindra Oka, Waterloo (CA); Christopher Harris Snow, Waterloo (CA); Sean Bartholomew Simmons, Waterloo (CA)

(73) Assignee: BlackBerry Limited, Waterloo (CA)

(*) Notice: Subject to any disclaimer, the term of this patent is extended or adjusted under 35 U.S.C. 154(b) by 273 days.

(21) Appl. No.: 13/634,534

(22) PCT Filed: Oct. 28, 2011

(86) PCT No.: PCT/CA2011/050677
§ 371 (c)(1),
(2), (4) Date: Sep. 12, 2012

(87) PCT Pub. No.: WO2013/059904
PCT Pub. Date: May 2, 2013

(65) Prior Publication Data
US 2013/0110754 A1    May 2, 2013

(51) Int. Cl.
*G06F 17/00* (2006.01)
*G06N 5/02* (2006.01)
*G06Q 10/04* (2012.01)
*G06Q 30/02* (2012.01)
*G06K 9/62* (2006.01)

(52) U.S. Cl.
CPC .............. *G06Q 30/02* (2013.01); *G06K 9/6296* (2013.01); *G06Q 10/04* (2013.01)
USPC ......................................................... 706/46

(58) Field of Classification Search
None
See application file for complete search history.

(56) References Cited

U.S. PATENT DOCUMENTS

| 6,886,010 B2 | 4/2005 | Kostoff |
| 6,952,688 B1 | 10/2005 | Goldman et al. |
| 7,143,091 B2 | 11/2006 | Charnock et al. |
| 7,788,264 B2 | 8/2010 | Zhu et al. |

(Continued)

FOREIGN PATENT DOCUMENTS

| CA | 2741085 A1 | 4/2010 |
| CA | 2751308 A1 | 3/2012 |
| EP | 2189905 A1 | 5/2010 |

OTHER PUBLICATIONS

Ayday, E., Faramarz, F.: "A Belief Propagation Based Recommender System for Online Services", RecSys2010, Sep. 26-30, 2010, pp. 217-220.

(Continued)

*Primary Examiner* — Michael B Holmes
(74) *Attorney, Agent, or Firm* — Jenna L. Wilson; Dimock Stratton LLP

(57) ABSTRACT

Systems and methods are provided for matching one or more first entities with one or more of second entities. Factor graph representations of the first entities and a plurality of second entities are stored. The factor graph representation of the plurality of second entities includes an identity variable referencing each of the individual second entities. When a request is received from a requesting one of the first set of entities for a match from the second set of entities, the first factor graph and the second factor graph are merged, and the merged graph is solved for a probability mass function for the identity variable to yield a probability vector to be used to identify those ones of the plurality of second entities having the highest probabilities as matches to be returned in response to the request.

25 Claims, 10 Drawing Sheets

(56) References Cited

U.S. PATENT DOCUMENTS

| | | | |
|---|---|---|---|
| 7,987,262 B2 | 7/2011 | Tung et al. | |
| 8,180,301 B2* | 5/2012 | Simmons et al. | 455/68 |
| 2004/0143636 A1 | 7/2004 | Horvitz et al. | |
| 2008/0268873 A1 | 10/2008 | Wymeersch et al. | |
| 2008/0319829 A1 | 12/2008 | Hunt et al. | |
| 2009/0052578 A1 | 2/2009 | Sawai | |
| 2009/0093287 A1 | 4/2009 | Herbrich et al. | |
| 2010/0005046 A1 | 1/2010 | Segel | |
| 2010/0079460 A1 | 4/2010 | Breeds et al. | |
| 2010/0082614 A1 | 4/2010 | Yang et al. | |
| 2010/0100416 A1 | 4/2010 | Herbrich et al. | |
| 2010/0125473 A1 | 5/2010 | Tung et al. | |
| 2010/0153324 A1 | 6/2010 | Downs et al. | |
| 2010/0169328 A1 | 7/2010 | Hangartner | |
| 2010/0185630 A1 | 7/2010 | Cheng et al. | |
| 2010/0223341 A1 | 9/2010 | Manolescu et al. | |
| 2010/0250196 A1 | 9/2010 | Lawler et al. | |
| 2010/0262568 A1 | 10/2010 | Schwaighofer et al. | |
| 2011/0041029 A1 | 2/2011 | Yedidia et al. | |
| 2011/0066577 A1 | 3/2011 | Van Gael et al. | |
| 2011/0116583 A1* | 5/2011 | Simmons et al. | 375/346 |
| 2011/0131163 A1 | 6/2011 | Stern et al. | |
| 2011/0219360 A1 | 9/2011 | Srinivasa et al. | |
| 2012/0078718 A1* | 3/2012 | Oka et al. | 705/14.53 |
| 2013/0234894 A1* | 9/2013 | Oka et al. | 342/451 |

OTHER PUBLICATIONS

Bunescu, R. C.: "Learning for Information Extraction: From Named Entity Recognition and Disambiguation to Relation Extraction", Dissertation presented to the Faculty of the Graduate School of the University of Texas at Austin, Aug. 2007, pp. 1-150.

Cudré-Mauroux, P. et al.: "idMesh: Graph-Based Disambiguation of Linked Data", International World Wide Web Conference Committee 2009, Apr. 2-24, 2009, Madrid, Spain, pp. 591-600.

Hu, D. H., Yang, Q., Li, Y.: "An algorithm for analyzing personalized online commercial intention", retrieved from http://www.cse.ust.hk/~derekhh/publications/adkdd2008.pd; published in Proceedings of the 2nd International Workshop on Data Mining and Audience Intelligence for Advertising (ADKDD '08). ACM, New York, NY, USA, pp. 27-36.

Jennings, N. R., "Decentralised Control of Complex Systems" (2007). Wirtschaftinformatik Proceedings 2007. Paper 6. Retrieved from users.ecs.soton.ac.uk/nrj/download-files/decentralised-control.pdf. pp. 1-50.

Naphade, M. R., Kozintsev, I. V., Huang, T.S.: "A Factor Graph Framework for Semantic Video Indexing", IEEE Transactions on Circuits and Systems for Video Technology, vol. 12, No. 1, Jan. 2002, pp. 40-52.

Naphade, M. R., Huang, T.S.: "Extracting Semantics From Audiovisual Content: The Final Frontier in Multimedia Retrieval", IEEE Transactions on Neural Networks, vol. 13, No. 4, Jul. 2002, pp. 793-810.

Aberdeen, D., Pacovsky, O., Slater, A.: "The Learning Behind Gmail Priority Inbox", in NIPS 2010 Workshop on Learning on Cores, Clusters and Clouds, 2011, pp. 1-4.

Dietz, L.: "Exploiting Graph-Structured Data in Generative Probabilistic Models", Dissertation presented to the Naturwissenschaftlich-Technischen Fakultät I der Universität des Saarlandes, Jan. 11, 2011, pp. 1-165.

Murphy, J.: "The State of Machine Learning and Artificial Intelligence in Computer Games", Jun. 12, 2009, pp. 1-9.

Stern, D., Herbrich, R., Graepel, T.: "Matchbox: Large Scale Online Bayesian Recommendations", International World Wide Web Conference Committee 2009, Apr. 20-24, 2009, Madrid, Spain, 10 pgs.

de Campos, L. M. et al.: "Combining content-based and collaborative recommendations: A hybrid approach based on Bayesian networks", International Journal of Approximate Reasoning, vol. 51, No. 7, Sep. 2010, pp. 785-799.

Huang, Z. et al.: "A Graph-based Recommender System for Digital Library", In Proceedings of the Second ACM/IEEE-CS Joint Conference on Digital Libraries, Portland, Oregon, USA, Jul. 13-17, 2002, JCDL '02. ACM Press, New York, NY, pp. 65-73.

International Search Report dated Jul. 24, 2012 from PCT/CA2011/050677, 4 pgs.

* cited by examiner

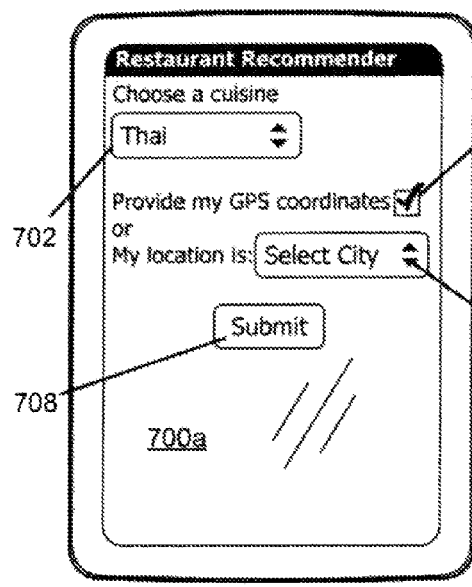
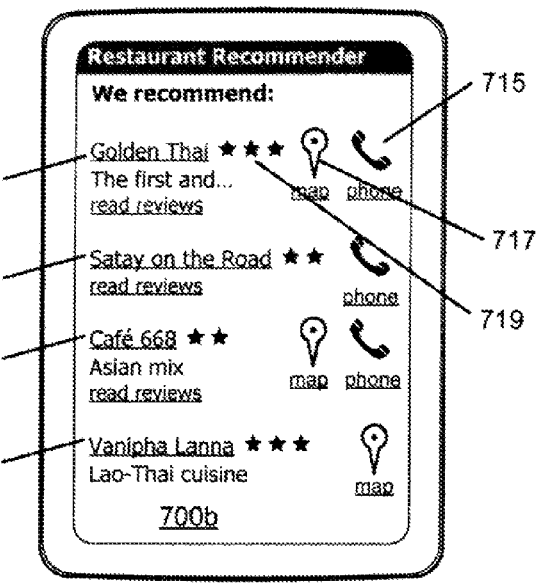
FIG. 7A     FIG. 7B
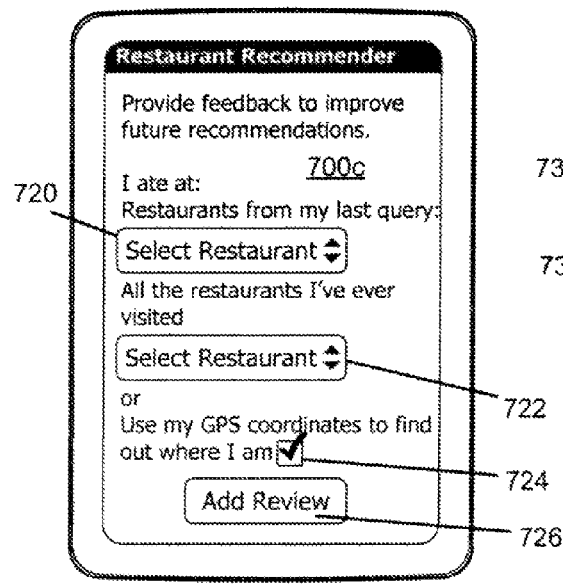
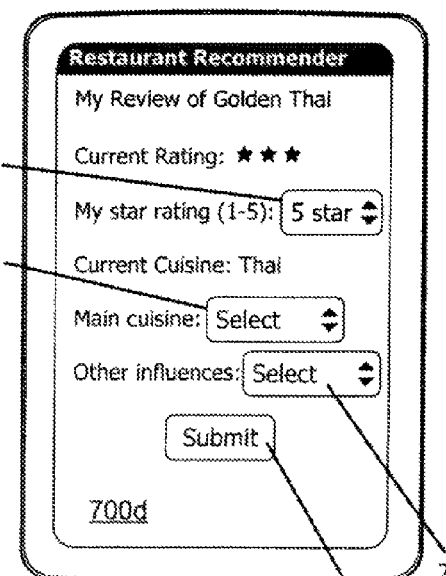
FIG. 7C     FIG. 7D

US 8,909,581 B2

FACTOR-GRAPH BASED MATCHING SYSTEMS AND METHODS

BACKGROUND

1. Technical Field

The present disclosure relates generally to a matchmaker or recommender service for matching a first set of entities with a second set of entities.

2. Description of the Related Art

With myriad goods and services available, consumers frequently wish to narrow down the scope of options when choosing from a variety of possible products or service providers. In an online or e-commerce environment, simple searches and filtering based strictly on information about the products or service providers do not take into account an individual consumer's preferences, and thus typically provide only impersonal search results that may be tailored to reflect availability of the product or service based on the consumer's geographic location. Recommendations based on known consumer preferences—whether the consumer's own preferences or the preferences of other consumers similarly situated to the searching consumer—can be used to customize search results to those that are thought to be of most interest to the consumer. Conversely, an advertiser of a good or service wishing to maximize the effectiveness of an advertising campaign may wish to target a particular set of consumers with direct advertising.

Two main approaches to recommendation or "matchmaking" are collaborative filtering and content-based filtering. Collaborative filtering selects or orders search results based on computed values derived from known preferences for many consumers, whereas content-based filtering leverages knowledge about the products and services, and optionally about the individual consumer seeking recommendations. Collaborative and content-based filtering may be used in tandem.

BRIEF DESCRIPTION OF THE DRAWINGS

The drawings illustrate example embodiments of the present application.

FIGS. 7A through 7D are illustrations of example graphical user interfaces for a mobile device-based recommender client.

DETAILED DESCRIPTION

Figure 1:
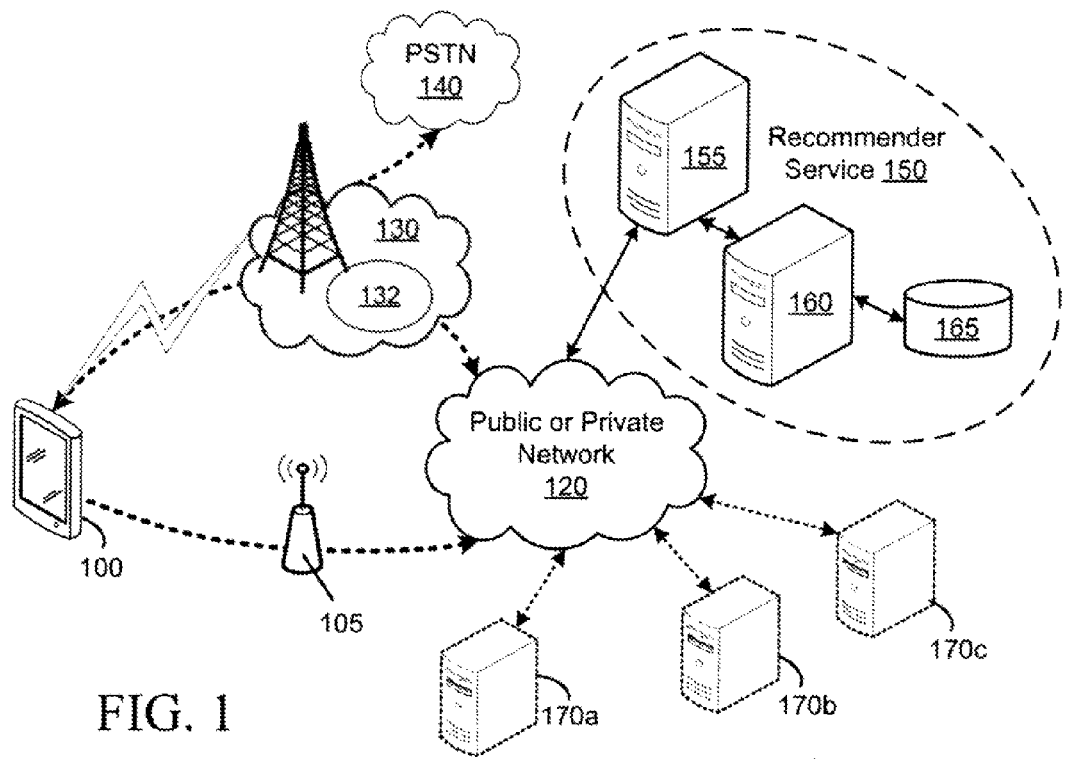
FIG. 1 is a schematic diagram illustrating a network topology for use in providing and receiving recommendation information, including a mobile communication device and a recommender service.

The example embodiments described herein provide an improved system and method arranged to provide matchmaking or recommendation services between two sets of entities using a scalable content-based filtering technique, implementable at an electronic device such as a mobile communication device or a server. The first set of entities is a requesting entity or group of requesting entities. In a typical business scenario, the first set of entities can be a single user (or consumer, in a business context) or a group of users (consumers). The second set of entities is a set of available entities, which are "available" in the sense that they are known and recorded. The second set of entities is the set of objects, services, products or items, or logical representations thereof, for which the first set of entities seeks a recommendation or match. Thus, the second set of entities may include service providers or product providers of any type. In other scenarios, such as directed advertising or direct marketing, the first set of entities (the requesting entities) may be one or more providers of products or services or advertisers, and the second set of entities is a group of users or consumers defined by demographics and/or technical or geographic considerations (such as the user's availability to be contacted over a network or the user's physical proximity to an advertised retailer or service). In still other contexts such as personal productivity, the requesting entity may be a single user or group of users, and the second set of entities a collection of personal information management or message items such as contacts, files, folders, electronic messages such as but not limited to email, instant, SMS, MMS, voicemail, or VVM messages, or other types of messages.

Thus, the "matchmaking" or "recommendation" services described herein are not intended to be limited to specific forms or services of matchmaking and recommendation-making for specific entity types unless expressly stated; rather, they are intended to encompass any personal, professional, charitable and retail items, services and products in a variety of contexts ranging from personal productivity and entertainment to business contexts such as customer-to-customer, business-to-customer, and business-to-business. Accordingly, while the example embodiments herein are described with reference to a user seeking recommendations for a retail service, here a restaurant that best matches the user's known preferences, it will be appreciated by those skilled in the art that the example embodiments herein are in no way limited to this specific context.

There is thus provided an example embodiment method, including: storing a first factor graph representation of a probability distribution describing one or more first entities, the first factor graph representation including a plurality of first factors dependent on one or more of a first set of characteristic variables; storing a second factor graph representation of a probability distribution describing a plurality of second entities, the second factor graph representation including a plurality of second factors dependent on one or more of a second set of characteristic variables, at least one of said second set of characteristic variables corresponding to at least one of said first set of characteristic variables, and a further one of said second set of characteristic variables including an identifier variable taking values from the plurality of second entities; and in response to a request received from a requesting device, the request including at least one value for at least one of the first set of characteristic variables, solving for an a posteriori probability mass function of said identifier variable, the probability mass function including a set of probability values, by executing a message-passing algorithm on a merged factor graph representation including said first and second factor graph representations using said at least one value; and identifying, in response to said request, at least one of the plurality of second entities corresponding to a highest one of the set of probability values.

In one example aspect, the method includes, in response to said request, transmitting to the requesting device an identifier for said at least one of the plurality of second entities thus identified.

In another example aspect, the method further includes: receiving from the requesting device feedback data relating to a selection of one of the plurality of second entities by the one or more first entities; and updating at least one of the first factor graph representation and the second factor graph representation using said feedback data.

There is provided an example embodiment computer readable medium, which may be non-transitory or physical, storing or bearing code which, when executed by one or more processors, causes a device such as an electronic communication device or server to carry out the within methods.

There is also provided an example embodiment electronic device, such as a server or user communication device, adapted to carry out the above method. There is also provided a system, including: a memory; a communications subsystem; and at least one processor in communication with the memory and the communications subsystem, the at least one processor being configured to: store in the memory a first factor graph representation of a probability distribution describing one or more first entities, the first factor graph representation including a plurality of first factors dependent on one or more of a first set of characteristic variables; store in the memory a second factor graph representation of a probability distribution describing a plurality of second entities, the second factor graph representation including a plurality of second factors dependent on one or more of a second set of characteristic variables, at least one of said second set of characteristic variables corresponding to at least one of said first set of characteristic variables, and a further one of said second set of characteristic variables including an identifier variable taking values from the plurality of second entities; and in response to a request received via the communications subsystem from a requesting device, the request including at least one value for at least one of the first set of characteristic variables, solve for an a posteriori probability mass function of said identifier variable, the probability mass function including a set of probability values, by executing a message-passing algorithm on a merged factor graph representation including said first and second factor graph representations using said at least one value; and identify, in response to said request, at least one of the plurality of second entities corresponding to a highest one of the set of probability values.

In one example aspect, the at least one processor is further configured to, in response to said request, transmit via the communications subsystem to the requesting device an identifier for said at least one of the plurality of second entities thus identified.

In another example aspect, the at least one processor is further configured to: receive via the communications subsystem, from the requesting device, feedback data relating to a selection of one of the plurality of second entities by the one or more first entities; and update at least one of the first factor graph representation and the second factor graph representation using said feedback data.

With regard to the above example embodiments, in one example aspect, a plurality of said second set of characteristic variables corresponds to a plurality of said first set of characteristic variables.

In another example aspect, the plurality of first factors includes factors derived from at least one of a user profile and domain knowledge.

In a further example aspect, the plurality of second factors includes factors derived from public knowledge of each of said plurality of second entities.

In still another example aspect, the at least one of the plurality of second entities corresponding to a highest one of the set of probability values thus determined includes one or more of the plurality of second entities corresponding to a probability value above a predetermined threshold.

In yet another example aspect, the first factor graph representation describes a plurality of first entities, and further includes an identifier variable taking values for said plurality of first entities.

In still a further example aspect, the at least one value is derived from current observation data at the requesting device. Further, the current observation data may include at least one of user input, sensor data, and environmental data.

In another example aspect, the one or more first entities includes one or more users, and the plurality of second entities includes a plurality of service providers.

These example embodiments will be described and illustrated primarily in relation to a recommendation service, which can encompass a matchmaking service, and which may include one or more electronic devices such as servers (for ease of reference, generally described herein as a "recommendation" or "recommender" server or service), databases, computing devices, communication devices, or other computing equipment adapted to communicate over a network (either fixed or wireless) directly or indirectly with requesting devices. Requesting devices may include electronic devices such as servers, personal computers, or other data processing or communication devices such as wireless communication devices communicating over fixed and wireless networks and public networks. It will be appreciated by those skilled in the art, however, that this description is not intended to limit the scope of the described example embodiments to implementation on these particular systems or devices. For example, the methods and systems described herein may be applied to any appropriate communication device or data processing device adapted to communicate with another communication or data processing device over a fixed or wireless connection, whether portable or wirelessly enabled or not, whether provided with voice communication capabilities or not, and additionally or alternatively adapted to process data and carry out operations on data in response to user commands for any number of purposes, including productivity and entertainment. Thus, the example embodiments described herein may be implemented on computing devices adapted for communication tasks such as messaging and retrieval of data, including without limitation cellular phones, smartphones, wireless organizers, personal digital assistants, desktop computers, terminals, laptops, tablets, handheld wireless communication devices, notebook computers, entertainment devices such as MP3 or video players, and the like. Unless expressly stated, a requesting or electronic device can be a computing or communication device such as any of the above, and a recommendation system or server may include similar types of devices, configured to provide some or all of the recommendation processes or subprocesses described herein. The configuration and operation of all such devices generally will be known to those skilled in the art. As another example, the methods and systems described herein are described generally in the context of a client-server system. However, it will be appreciated that this type of architecture is not strictly necessary.

In the examples described herein, communication takes place over a public network (such as the Internet or a similar), adapted to implement the Internet Protocol Suite as defined in RFC 1122 as published by the Internet Engineering Task Force, and optionally its predecessor, successor, and accompanying or complementary standards. For example, communication may take place over an Internet Protocol (IP) network implementing the Transmission Control Protocol (i.e., a TCP/IP network). Reference to a TCP/IP-based communication system is made due to its prevalence; other protocols such as the User Datagram Protocol (UDP) may be implemented over an IP network. Again, however, the person skilled in the art will appreciate that the example embodiments described herein may be applied in environments and on networks implementing different communication protocols for formatting, addressing, transmitting and routing data.

An example network in which the within example embodiments may be implemented is illustrated in FIG. 1. A requesting device 100, here represented by a mobile device such as a smartphone or a tablet computer, is adapted to communicate over a fixed or wireless link with one or more network resources. In the example of FIG. 1, communications can take place over a public or private network 120 such as the Internet. Further, in the example of FIG. 1, wireless communication with the network 120 is illustrated with paths for both data and voice traffic (if the requesting device 100 is provisioned for voice communication), although the requesting device 100 may certainly access the network 120 over a fixed connection.

A requesting device 100's access to IP networks and to a public switched telephone network (PSTN) 140, if applicable, can be provided through the wireless network 130, which includes one or more nodes 132 configured for communication in accordance with a suitable mobile telephony standard. In turn, the wireless network 130 provides the requesting device 100 with connectivity to the Internet or other public wide area network 120, and thence to one or more services and systems. Alternatively, the requesting device 100 may access the network 120 without using the wireless network 130. Instead, the requesting device 100 may gain access to the network 120 via an access point or at a public or private Wi-Fi hotspot, represented by the access point 105.

For some wireless networks 200 or other networks, the requesting device 100 may be registered or activated with the respective network. A method for identifying a subscriber to a cellular network using a SIM or other identifier card is described below. Other methods of registering or identifying the requesting device 100 to various networks will be known to those of ordinary skill in the art. However, registration or activation may not be required for all wireless networks 200, LANs or WLANs, as some networks may allow access without prior registration or activation. The requesting device 100 may also be provisioned or configured to access one or more networks. Methods of provisioning services on a requesting device 100 will be generally known to those skilled in the art, but as a non-limiting example, a request for registration may be sent from the requesting device 100 to a registration server of a service (not shown). If the request is approved, the registration server may transmit to the requesting device 100 a service book or similar data item containing data and instructions to enable the requesting device 100 to provision the service. The service book, when received at the requesting device 100, may be self-executing, and permits the user to enter account information relevant to the associated service. This information is then transmitted from the requesting device 100 to a provisioning server of the service provider (not shown), which then creates a service account associated with the requesting device 100. Provisioning may also be carried out in compliance with the OMA DM (Open Mobile Alliance Device Management) specification version 1.2 or its predecessor or successor versions, published by the Open Mobile Alliance Ltd.

Services and systems 170a, 170b, 170c accessible over the network 120 can include one or more types of web-based services, such as a web server, messaging service, social network service, push service, online commerce (e-commerce) service, content service (e.g., newsreader or content aggregating services), and the like. These services may be accessible using a browser client application on the requesting device 100, or using other applications, applets, widgets and the like which may operate in a browser environment or in a different runtime environment; the applications and other modules used to access these services would therefore be configured to issue requests and to receive responses over the network 120 via the communication device 100's communication subsystems. One particular type of service is a recommender service 150, illustrated in FIG. 1 as including a web server 155, a recommendation module represented as a separate server 160, and a database 165. These components may be integrated in a single server or across multiple computing devices. The recommender service 150 may be provided as a standalone service, as shown here, or may be incorporated into another online service 170a, 170b, 170c.

Figure 2:
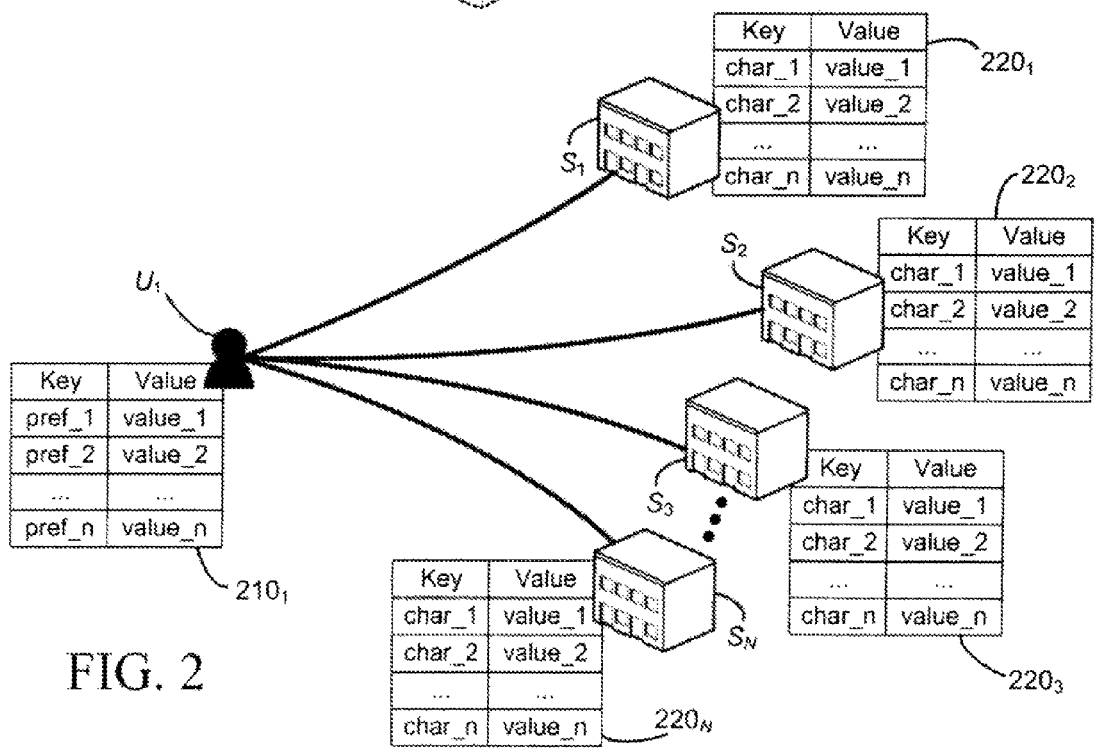
FIG. 2 is a schematic diagram illustrating a correlation between a user and a set of service providers.

In the example context used for the purpose of illustration here, the first set of entities is represented by a user $U_1$ in the schematic of FIG. 2, which illustrates a correlation between a notional user and a set of service providers. The user $U_1$ may have a number of characteristics represented by the table $210_1$. In FIG. 2, these characteristics are represented by a set of key-value pairs for ease of illustration. The values representing these characteristics, however, may be stored in any appropriate form. These characteristics collectively form a profile for the entity, user $U_1$.

The second set of entities is represented by services $S_1, S_2, S_3 \ldots S_N$, each of which is described by a set of characteristics, again represented as a corresponding table of key-value pairs $220_1, 220_2, 220_3 \ldots 220_N$. Again, the key-value pair representation is used only for convenience.

The characteristics of the first and second sets of entities define the dimensions of the problem of matching the first set of entities to the best match of the second set of entities. These dimensions may be considered as axes of a coordinate system in an abstract problem space. While the portrayal of entity characteristics as key-value pairs suggests that these entities may be conveniently represented as vectors in the problem space, this is possibly misleading because in practice, the characteristics in sets $210_1$ and the various $220_i$ may not be perfectly known. What may be known, instead, is a probability or "belief" about the entity's correspondence to or compliance with a particular characteristic. Thus, each entity is effectively a probability distribution of compliance with each such characteristic on the problem space within the space of all possible distributions on the problem space, the statistical manifold $\aleph$.

As the person skilled in the art will appreciate, formulating the matchmaking problem in a statistical manifold in this manner permits the expression of probability distributions in $\aleph$—and thus the expression of the entities $U_1$ and $S_i$—in one of several canonically equivalent ways, such as an exponential model or a bipartite factor graph. A factor graph provides a graphical representation of a mathematical problem featuring nodes, or factors, each of which represents an arbitrary multivariate function. Factors in the graph are interconnected via one or more variables representing each of the characteristics—in other words, are dependent on one or more variables—and the structure of the graph represents the conditional independence of the variables. The problem may then be "solved" to find the best match between the first set of entities and one of the second set of entities, for example by finding the member of the second set of entities with a probability distribution that is the "closest" to the probability distribution of the first set. This "distance" may be determined using an appropriate criterion, such as the Kullback-Liebler divergence of the first set's probability distribution and each of the probability distributions of the members of the second set.

$\aleph$ is, however, possibly a very high dimensional space. The dimensions of $\aleph$ may far exceed the number of dimensions d of a single entity or of the entire problem space (i.e., the number of possible characteristics of any entity within the statistical manifold $\aleph$ may greatly exceed the number of characteristics defined for the first and second sets of entities for a given matchmaking or recommendation problem). Accordingly, for efficiency, the dimensions of the problem are restricted to a smaller set of characteristics, and consequently to a lower-dimension sub-manifold within $\aleph$.

To give a specific example in the example embodiment, consider that the first set of entities includes only a single user, a consumer, and the second set of entities is a finite number of restaurant service providers. Possible dimensions of the problem include user- and service provider-specific characteristics, each of which is represented by a variable. Examples of service provider-specific characteristics include the type of cuisine served by the restaurant, types of food, the restaurant's location, the restaurant's rating, its prices, its standing with its municipal health inspection authority, whether the restaurant services clients with special dietary requirements such as vegetarian, vegan, halal, kosher, or allergen-free requirements, and the like. Examples of user-specific characteristics include the user's own requirements regarding dietary laws or rules; preferences for different types of cuisine; the user's location; time of day, and whether the current time is considered to be a mealtime; and the user's own rating or preference for a given, specific restaurant. These examples of characteristics are only a small subset of possible characteristics that may impact the solution of the matchmaking problem, as any number of subtle or seemingly unrelated factors, such as the length of time the restaurant has been in business, the weather forecast for the next day or week, or the user's cash flow, can also influence the accuracy of a match between the user and a restaurant. For ease of reference, however, in the examples provided herein only a limited number of characteristics are portrayed.

In view of the number of possible characteristics (variables), the dimensions of the problem are therefore indeterminate, and may in some cases be infinite. Appropriate selection of a subset of characteristics for both the first and second entities—i.e., limitation of the problem dimensions to a computationally practical size—is therefore carried out usefully with the assistance of a domain expert having subject matter knowledge to identify appropriate characteristics to balance the need for a computationally manageable problem, impact of the characteristic on the matchmaking solution, and availability of data for that characteristic. The creation of a probabilistic description for each of the first and second entities, which involves selection of appropriate characteristics for each entity, will be known to those skilled in the art for the relevant field of the matchmaking problem, whether it is for the purpose of restaurant recommendation as in the example embodiment, the identification of important emails, or the recommendation of appropriate products or other items to the user.

Moreover, as noted above there is imperfect knowledge regarding a number of these characteristics, even those characteristics selected for the limited subset. For example, while a restaurant might advertise that it serves Italian cuisine, in fact it may offer unadvertised dishes of diverse regional backgrounds including Greek and Spanish. While a user might have a strong preference for vegetarian cuisine, he or she may not be exclusively vegetarian. Further, the user's decision to prefer a particular regional cuisine may be influenced by the availability of vegetarian dishes or vice versa.

Figure 3:
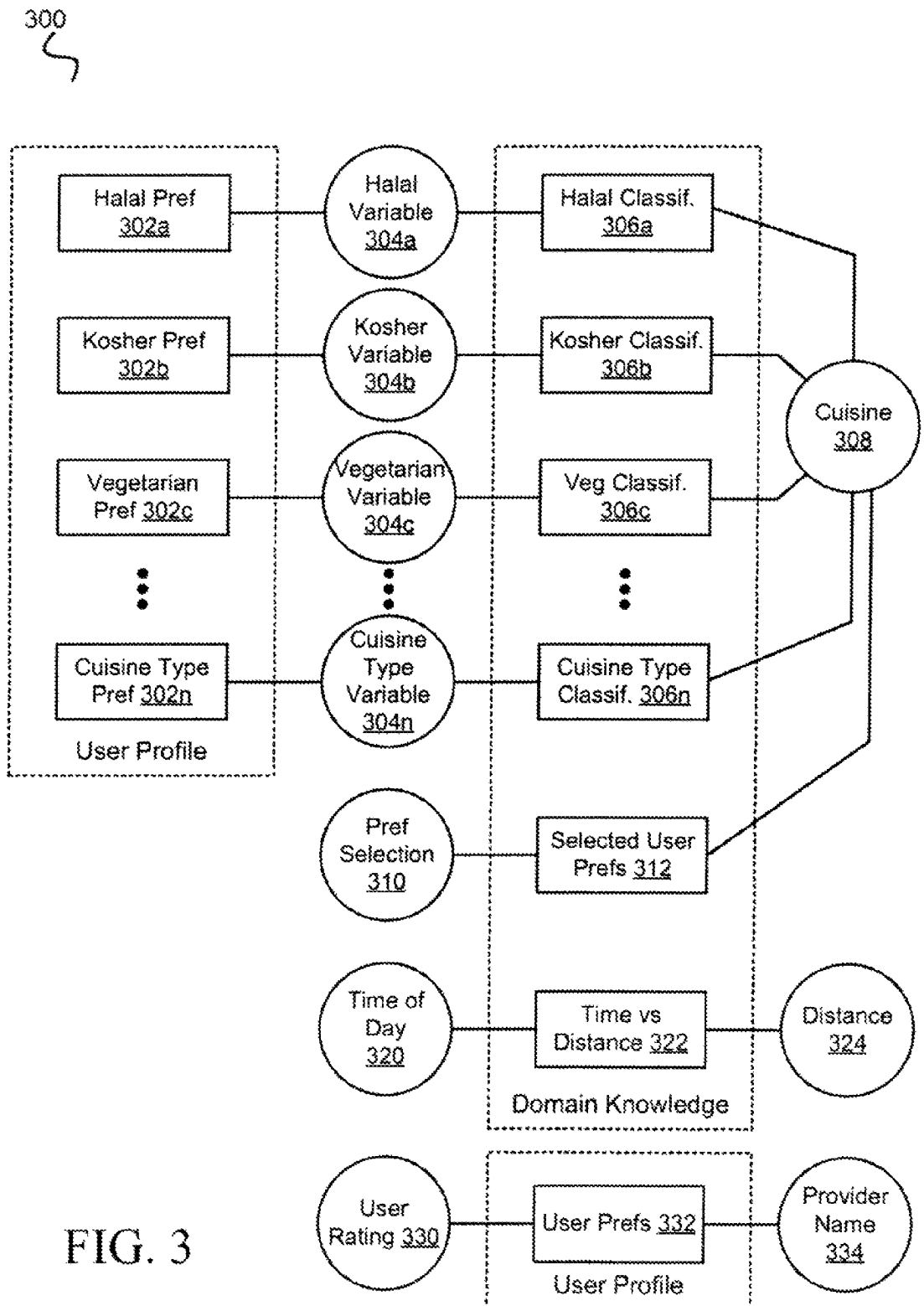
FIG. 3 is an example of a factor graph defining a possible user profile.

A possible relationship of factors defining a user's profile in this example is illustrated in FIG. 3. FIG. 3 is a factor graph 300 having a tree structure showing the interconnection of factors (shown as rectangles) connected by edges representing variables (indicated in the circles disposed on the edges). These factors each represent a function—i.e., an arbitrary multivariate function reflecting the degree of probability (or a "belief") for this given user, which is dependent on the illustrated variables. Each factor is dependent on at least one variable. Thus, for example, the function represented by the factor Halal Classification 306a is a probability distribution representing the entity's correlation with a defined characteristic, in this case whether the restaurant is halal-compliant. The factor 306a is dependent on the variables Halal 304a and Cuisine 308, as indicated by the edges connected to Halal Classification 306a. In other words, the function of Halal Classification 306a may be expressed as $f_{HC}(x_{halal}, x_{cuisine})$ where the subscripted x variables represent the Halal 304a and Cuisine 308 variables, respectively. The factor Halal Preference 302a is in turn dependent on the Halal variable 304a, but only on that variable, as evidenced by the fact that only one edge is connected to Halal Preference 302a. The Halal Preference 302a may thus be expressed as the function $f_{HC}(x_{halal})$ to indicate that it is dependent on one variable alone.

Determination of the dependencies of each function or factor on variables—i.e., the construction of the factor graph 300—may be made based on a theoretical basis, for example based on a domain or subject matter expert's knowledge about the influence these variables have on user behaviour or preferences. The factor graph 300 may also be constructed based on observed relationships or dependencies between these variables and user behaviour or preferences. For example, the Halal Classification factor 306a represents the probability distribution that a given restaurant is considered to be a restaurant compliant with halal laws. This function is dependent on the nature of cuisine served by the restaurant (i.e., the Cuisine variable 308), since certain genres or classifications of cuisine are more likely to be halal-compliant while others are less likely to be halal-compliant. The Halal Classification factor 306a is also dependent on whether the restaurant actually serves halal cuisine, as indicated by the function's dependency on the Halal variable 304a. This relationship between cuisine genre and halal compliance may be derived from experiential information of the domain expert or may be determined from direct observation.

In addition, this relationship, however it is determined, may be considered to be information applicable to any user. Such generally applicable knowledge may therefore be termed "domain knowledge", since it applies to the entire domain (i.e., area of knowledge, as defined for this particular matchmaking problem). On the other hand, the relationship between a user's own preference for a restaurant based on halal compliance is knowledge about that specific user, and therefore is considered to be user-specific knowledge, or part of the "user profile" as labelled in FIG. 3. The factors may be represented by a matrix including real values greater than or equal to zero. The values need not be limited in this manner, but rather may be expressed using any appropriate scale. During a later stage of computation when determining a recommendation, these values may be normalized as necessary.

Other examples of similar domain knowledge with respect to dietary requirements are illustrated in FIG. 3 in respect of Kosher Classification 306$b$, dependent on a kosher variable 304$b$ and on the Cuisine variable 308, as well as the Vegetarian Classification 306$c$, dependent on a Vegetarian variable 304$c$ and on the Cuisine variable 308. In the user's personal profile, the user's preference for a restaurant based on its kosher or vegetarian service is represented by the factors 302$b$ and 302$c$, respectively, which are dependent on the Kosher and Vegetarian variables 304$b$ and 304$c$, respectively.

Another example of user profile and domain knowledge is the relevance of cuisine type and genre on the user's preferences. The user's preference for a given restaurant will be dependent on the type of cuisine the restaurant serves, as reflected by the dependence of the user's Cuisine Type Preference factor 302$n$ on the Cuisine Type variable 304$n$. For example, given a set of possible cuisine types such as Belgian, Chinese, Filipino, French, Japanese and Korean, the user's Cuisine Type Preference factor 302$n$ may be expressed as:

[0.3 0.4 0.1 0.8 0.8 0.6]

indicating that the user prefers French and Japanese cuisine over the others identified.

Some factors may be classified into broader genres, as indicated by the functions 306$a$ . . . 306$n$. These classifications are not unique to a given user, and may thus be considered to form part of domain knowledge applicable to all users. For example, Chinese, Japanese and Korean cuisine may be considered to be examples of East Asian cuisine, whereas Filipino cuisine, while properly Southeast Asian, may occasionally be thought by users to be grouped with the East Asian classification. For a given set of possible cuisine classification types such as East Asian, Southeast Asian, European, and so on, a two-dimensional matrix can be defined for the factor 306$n$ where each row represents a cuisine classification and each column represents the cuisine type of 302$n$. Thus, the row associated with the East Asian classification may read:

[0 1 0.4 0 1 1]

reflecting that Chinese, Japanese and Korean cuisine are more strongly believed [ ] to be classified as East Asian cuisine, than the classification of Filipino cuisine as East Asian cuisine, while the belief that Belgian and French cuisine fall within that classification is nil (0% probability). As shown in FIG. 3, the Cuisine Type Classification factor 306$n$ is dependent both on the Cuisine variable 308 reflecting the genre of cuisine the restaurant serves, as well as the Cuisine Type variable 304$n$ representing the specific type of cuisine served.

The foregoing examples of factors represent both user profile factors and domain knowledge factors. Additional factors may be included. For example, the domain expert may collect data from observations of a sample of users and detect that the selection of a particular restaurant is dependent on the time of day and the distance between the user and the restaurant. This dependency may manifest itself in the observation that users looking for a place to eat at midday on a weekday are less likely to go to restaurants that are a significant distance away from their current location (e.g., no more than 2 km away), whereas in the evening, the correlation between the distance from the restaurant and the user and the belief that a particular restaurant will be preferred by the user is weaker. Accordingly a factor representing a probability distribution function of a restaurant preference based on the user's distance from the restaurant would be dependent on both the time of day and on the distance between the user and the restaurant. Because this relationship is likely consistent across most users (and in particular given that this relationship was derived from observation of a group of users), it is considered to be part of domain knowledge, as indicated in FIG. 3, although in some example embodiments, the relationship may be highly unique to individuals and therefore may be more properly considered to form part of the user's profile.

This relationship is reflected in the factor graph 300 of FIG. 3, which includes a factor Time vs Distance 322, which is dependent on the variables Time of Day 320 and Distance (from Restaurant) 324. This factor, having two input variables, may be represented by a two-dimensional matrix correlating distance from the restaurant identified by column (less than 1 km, 1 to 2 km, 2 to 5 km, 5 to 15 km, greater than 15 km) with rows representing time of day or mealtime (morning, lunchtime, afternoon, dinnertime, nighttime). A matrix element with a greater value would indicate a stronger belief in the correlation of that particular distance and time of day.

This factor 322 and these variables 320, 324 are unconnected from the aforementioned Halal variable 304$a$, Halal Classification factor 306$a$, and Cuisine variable 308, in this case because the observables collected from the user sample tend to indicate that the user's time versus distance preference is generally unaffected by the type of cuisine served by the restaurant.

Further, it may be noted that some users have distinct likes and dislikes that may be informed by factors other than cuisine, time, distance, or any other considerations mentioned above. A user may have a like or dislike for a given restaurant due to past experience or association with a given restaurant brand, which can be accounted for by a further factor, User Preferences 332. This factor may be dependent only on the user's own rating (the variable User Rating 330) and on the identity of the restaurant (Provider Name 334). This factor forms part of the user's personal profile, and in this case is represented by a matrix correlating user ratings against specific restaurants.

In addition, the fact that a user may express certain types of preferences—for example, that he or she feels strongly enough about a restaurant brand to express a dislike of it, or strongly enough about a dietary requirement or cuisine type so as to choose to identify that requirement or type as a preference when preferences about other cuisines are not identified by the user—may be incorporated into the factor graph 300 as well, since those considerations may have an effect on the impact that other factors should have on the user's preferences as well. As one example, a user who feels strongly enough about eating kosher food so as to express a strong preference for it may be inferred to have a preference (albeit weaker) for halal food, since although kosher and halal are not identical, in some respects they may be considered sufficiently similar to the user so as to be interchangeable. This factor is not actually part of the user's personal profile; rather, it is domain knowledge based on observation of or assumptions about an aggregate group of users. Factors such as these are represented by the factor Selected User Preferences 312, which is dependent on the user's expressed preferences (Preference Selection variable 310) and on Cuisine 308.

It can be seen from the foregoing discussion of only the user's factor graph 300 that a number of factors and variables may come into play when defining the user's preferences based on personal and domain knowledge. The factors may be determined from a user profile or from domain knowledge, and factors determined from either source may be dependent, as reflected by the variables (edges) connecting these factors in the factor graph 300. Some factors may be defined based on user feedback or other information supplied by the user (for example, the user may identify to the constructor of the factor graph which types of cuisine he or she prefers, and indicate whether he or she likes a particular restaurant) or by domain experts based on observation or assumption, as explained above. Variables are generally objective measurements, such as the local time or the user's geographical location as may be determined by a GPS or other location technology-enabled communication device. Some variables and factors are more easily expressed by numeric values, while others may be easier to conceptualize as labels or as Boolean values (true or false).

Figures 4, 5:
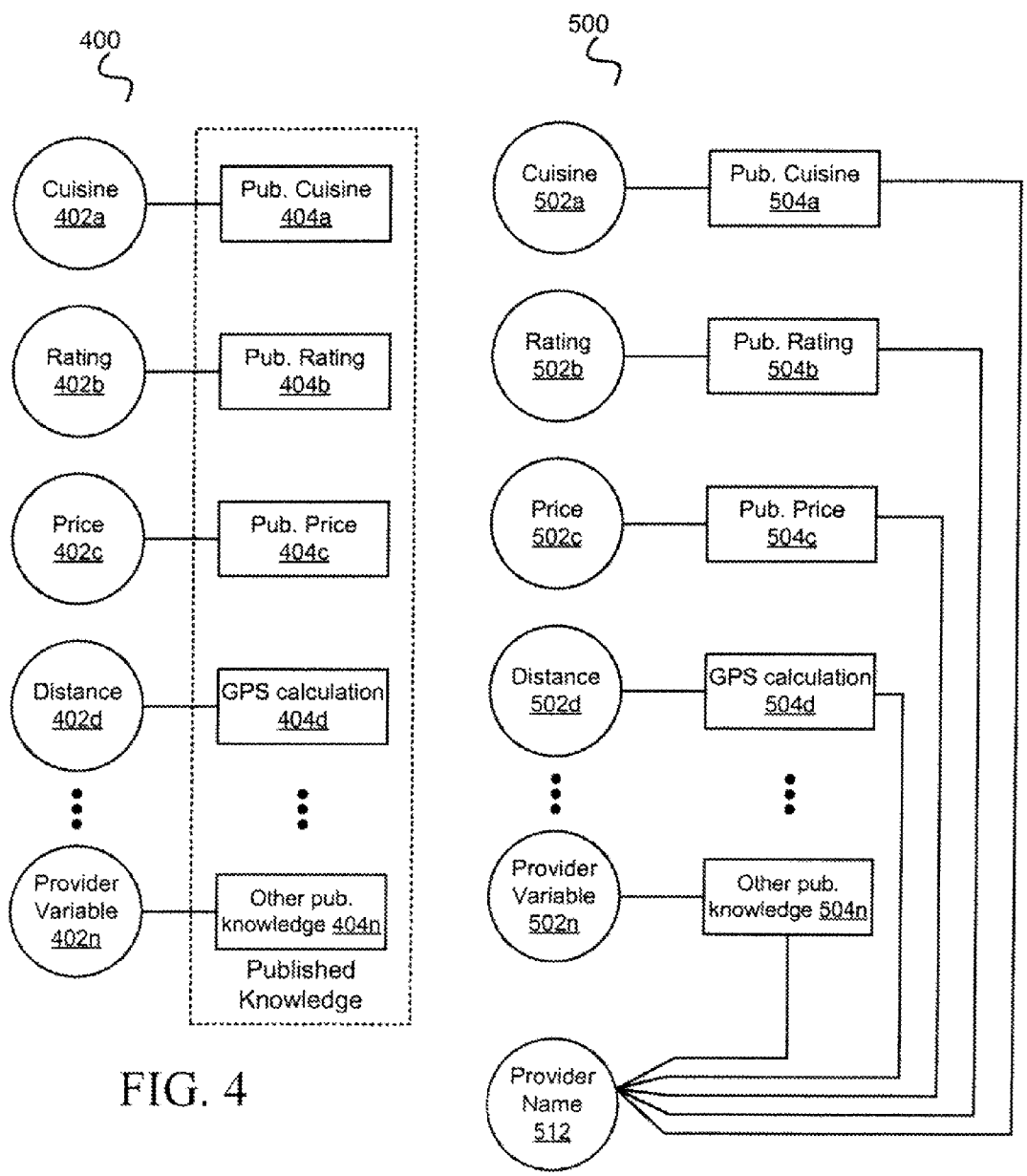
FIG. 4 is an example of a factor graph defining a possible service provider profile.
FIG. 5 is an example of the factor graph of FIG. 4 uplifted by a further dimension.

Similarly, the service provider, in this case a given restaurant, is also defined by a probabilistic description of its characteristics, and can be represented by a factor graph representing the belief (or probability) that the restaurant has certain characteristics. A factor graph 400 for a restaurant is illustrated in FIG. 4. Generally, a restaurant's factors (i.e., the factors pertaining to the second set of entities) are derived from published knowledge, and thus may be much simpler than the user's factor graph. In this example, the published knowledge is reflected in factors relating to the restaurant's Published Cuisine 404a, which is dependent on the variable Cuisine 402a. The Published Cuisine factor 404a is a probability function representing the belief of the restaurant's particular cuisine. Referring again to the set of possible cuisines (Belgian, Chinese, Filipino, French, Japanese and Korean), in the case of a restaurant that serves foods from various Asian cultures, the Published Cuisine factor 404a for a given restaurant may be expressed as:

[0 0.6 0.1 0.0 0.1 0.2]

indicating that the cuisine is largely Chinese, with contributions from the other listed Asian cuisines. Other factors include the Published Rating 404b, dependent on the rating variable 402b; the Published Price 404c, dependent on the Price variable 402c; the GPS Calculation 404d, which is dependent on the Distance variable 402d (i.e., the distance from the user). Other factors not explicitly set out in FIG. 4 are represented by the Other Published Knowledge factor 404n and the corresponding Provider variable 402n. It may be noted that in this example, the various factors are not interrelated since none of them are dependent on the same variables. Rather, the constructor of the factor graph 400 has determined that these factors are all independent of each other.

A separate factor graph 300 or 400 may thus be constructed for each member of the first set of entities and the second set of entities, respectively. In the example represented by FIGS. 3 and 4, the factor graph representing the first set of entities includes factors determined from both profile information for the first set of entities (in FIG. 3, the "user profile") and from domain knowledge. The factor graph representing the second set of entities in this example is determined from publicly available knowledge. In the case of a single user (represented by the factor graph 300 of FIG. 3) searching for recommendations for a restaurant from among a pool of one thousand restaurants, there would be only one user factor graph 300, but a thousand service provider factor graphs 400 that would need to be solved in order to determine which of the service providers of the thousand were the best matches for the user.

Given the factor graphs and thus the probability distribution for each user and each service provider, it is therefore possible to determine the "best" service provider for the user by measuring the "distance" between the user's probability distribution and each of the service provider distributions. The service provider probability distribution resulting in the smallest "distance" from the probability distribution of the user in the relevant manifold or sub-manifold is the best match.

As the person of ordinary skill in the art would appreciate, the distance between probability distributions may be approximated by solving the problem $$\hat{i} = \arg\min_{i=1,2,\ldots N} H(pq_i) \quad (1)$$

where p is the probability distribution of the user $U_1$, $q_i$ is the probability distribution of the ith service provider, and $H(\cdot)$ is the information theoretic entropy of a probability distribution (i.e., the measure of uncertainty associated with the unknown information of the problem). This approximation is derived from the Kullback-Leibler divergence, which may be used as a measure of distance between the distributions and provides a reasonable criterion for matching the user with the best service provider, but recognizing that to a first order this divergence is approximated and symmetrized by the Riemmanian metric derived from the Fisher information of the problem. Use of equation (1) thus suggests that the appropriate service provider is the one that minimizes the uncertainty when simultaneously considering the probability distributions of both the service provider and user; i.e., where p and $q_i$ are best matched to each other, meaning that the product $pq_i$ is a highly peaky probability distribution.

Equation (1) involves a pointwise multiplication of $r_i=pq_i$, meaning that in a factor graph representation of $r_i$, the factors of p and of $q_i$ are simultaneously present. Accordingly, the graphical models of the joint factor graph $r_i$ for i=1 … N could be easily constructed. It would then be necessary to compute the entropy $H(r_i)$ for each to identify the $r_i$ yielding the smallest entropy.

Unfortunately, while the computation of the entropy of $r_i$ may be within the knowledge of those skilled in the art, it is computationally complex, and the complexity increases exponentially with d, the number of dimensions of the problem. Calculating entropy for each possible joint factor graph $r_i$ therefore incurs a significant amount of processing and/or memory resources. The problem's complexity may be reduced by calculating instead an approximation of the entropy for each $r_i$ based on the entropies of its marginal distributions, where the marginal distributions are approximated using a message passing approximation technique such as the sum-product algorithm, which has complexity O(d). When the factor graph $r_i$ is tree-like and not cyclical, the exact entropy of the marginal distributions can be calculated, so the approximated entropy of $r_i$ will be the true entropy. Use of the sum-product algorithm to compute marginal distributions, and its programmatic implementation, as well as the programmatic representation of factor graphs, will be known to those skilled in the art. Details concerning the use of the sum-product algorithm are described, for example, in Kschischang, F. R., and Frey, B. J. and Loeliger, H., "Factor Graphs and the Sum-Product Algorithm", IEEE Trans. on Information Theory, February 2001, vol. 47, No. 2, pp. 498-519.

Even so, with complexity O(d) the sum-product algorithm must still be run independently on each factor graph N times (since i takes values 1 . . . N, one for each service provider). The number of service providers N may be quite large, particularly when the method is run for all possible matches (e.g., of restaurants) and is not limited by geographic region. It may also be large in cases where the matchmaking method is used to recommend consumer products, or individual data items such as emails. Again, solving this problem likely would consume a significant amount of processor and memory overhead.

Accordingly, to further reduce the computational burden and complexity in solving the problem of identifying the best matches for the user (or other first set of entities), a new factor graph is constructed to jointly represent all service providers. To construct this new factor graph, it is presumed that a generic factor graph structure can be used to represent the probability distribution for each member of a set of entities, although the values of the individual factors in the factor graph structure may vary for each member. Thus, given a generic factor graph for a single member of the second set of entities, in this case the restaurant service provider $q_i$, an extra identifying variable is added to represent the name or identity of the service providers. This new variable can be expressed in vector form, where each value in the vector corresponds to and takes a value from one of the set of second entities (i.e., the set of service providers).

Adding this extra variable to the factor graph uplifts every factor in the existing graph 500 by one dimension. Thus, where a factor in $q_i$ was previously a vector, it will be uplifted to a two-dimensional matrix, and will be dependent on one additional variable. An example is illustrated in FIG. 5 where the additional variable Provider Name 512 has been added and is connected to each of the previously existing factors in a new factor graph 500. Each of the factors, Published Cuisine 504a, Published Rating 504b, Published Price 504c, GPS Calculation 504d, and any other factors based on published knowledge 504n, are thus dependent not only on their previous corresponding variables 502a, 502b, 502c, 502d . . . 502n, but also on Provider Name 512.

The uplifted factors that were previously vectors are now simply row-wise stackings of the probability distributions of all individual service providers in this restaurant example. Recalling that in FIG. 4, a given restaurant's Published Cuisine factor 404a was expressed as a vector of probabilities concerning the restaurant's cuisine, a possible probability distribution for that factor 610a is now:

$$\begin{bmatrix} 0 & 0.6 & 0.1 & 0 & 0.1 & 0.2 \\ 0.5 & 0 & 0 & 0.5 & 0 & 0 \\ 0 & 1 & 0 & 0 & 0 & 0 \\ 0 & 0 & 0 & 0 & 0.9 & 0.1 \end{bmatrix}$$

Thus, the vector from the discussion of FIG. 4 above now forms one row of a two-dimensional matrix, where the rows of the matrix correspond to the probability distributions for the cuisines of the individual restaurants of the second set of entities. Similarly, the other factors in FIG. 4 are also uplifted by one dimension. FIG. 5 thus represents the entire second set of entities.

Figure 6:
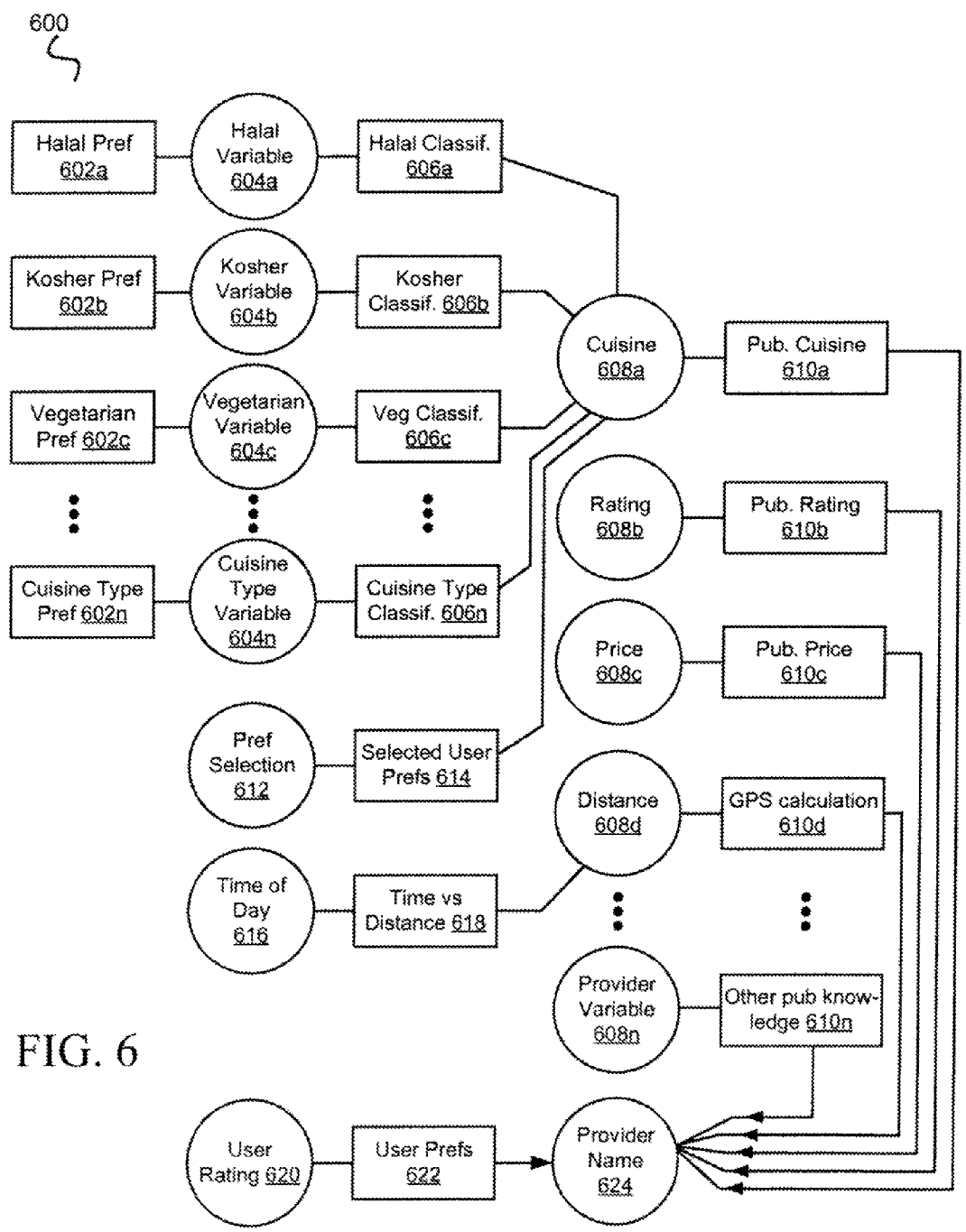
FIG. 6 is an example of a merged factor graph based on the factor graphs of FIGS. 3 and 5.

To solve the matchmaking problem, the factor graph 500 representing the second set of entities is again merged with the factor graph 300 representing the user, yielding the merged factor graph 600 of FIG. 6. It can be seen in this example that the merger reflects the common dependencies on three variables that existed in the user's factor graph 300 and in the factor graph 500 representing all service providers: Cuisine 608a, Distance 608d, and Provider Name 624. In other cases, there may not be as many common variables; for example, if the factor graph 300 for the user omitted the Time vs Distance 618 factor because it was determined that this factor should not form part of the user's factor graph, then the mutual dependency of both Time vs Distance 618 and GPS calculation 610 on the Distance 608d would not exist. (In that case, it may be that the factor of GPS calculation 610 would be omitted from the factor graph 500 as well, so this branch of the factor graph 600 would not be present at all.) To provide a merged factor graph, it is not necessary that the two independent graphs (i.e., the first entity profile factor graph 300 and the second entities' profile factor graph 500) be dependent on a plurality of common variables. The two factor graphs may have only one variable in common, such as Cuisine 608a.

The merged factor graph 600 has a tree structure. Starting with the user profile characteristics, it can be seen that user preference factors such as dietary restrictions and cuisine type 602a . . . 602n are again dependent on their corresponding variables 604a . . . 604n, and further that the previous classification factors 606a . . . 606n are also dependent on variables 604a . . . 604n, as well as on the Cuisine variable 608a. Similarly, the Selected User Preferences variable 614 is again shown as dependent on a Preferences Selection variable 612 and on the Cuisine variable 608a, and the Time vs Distance factor 616 is again connected to the Time of Day variable 616 and Distance variable 608d. Each of the published knowledge factors 610a . . . 610n in the service provider profile is still connected to their corresponding variables 608a . . . 608n. In addition, each of the service provider factors 610a . . . 610n is now dependent on the Provider Name variable 624 and is therefore uplifted by an additional dimension, as described above. The Provider Name variable 624 and the user rating variable 620 continue to be inputs for the User Preferences factor 622.

Because of the aforementioned uplifting of one of the variables, rather than solving for the marginal probabilities of each individual factor graph for each individual service provider, it is now possible to simply solve the merged factor graph 600 for an a posteriori probability mass function of the merged Provider Name variable 624, given a value for at least one variable represented by the merged factor graph 600 again using an appropriate technique such as the sum-product algorithm. The person skilled in the art will appreciate that it is no longer necessary to compute an approximate entropy for the new merged factor graph. Instead, it is simply necessary to read out the converged belief vector (since as mentioned above the variable 624 may be represented by a vector) on the variable for the name of the service provider, which defines the probability mass function of the variable; that vector will contain the answer to the matchmaking problem. The resultant vector will include a set of values corresponding to the set of second entities (i.e., service providers) represented by the factor graph 600, and each value will represent a probability or a posteriori belief for the corresponding one of the second entities, based on the a priori beliefs represented in the factor graph 600. The second entity corresponding to the greatest value in the solved variable 624 will therefore be the best match or the best recommendation based on the other information represented in the factor graph 600.

In other words, since the factor graph 600 can now be solved (using a message passing algorithm, for example) for the vector representing the Provider Name, it is not necessary to compute the entropy for each individual second entity before identifying the one second entity that is the best match for the first entity. Obtaining a vector of probability values for the Provider Name variable 624 is sufficient. It will be appreciated by those skilled in the art that this solution, which can be implemented in software using known numerical and other computation techniques, requires significantly less computational power and memory than the above-mentioned prior solution method.

In the example of FIG. 6, the uplifted Provider Name variable 624 is coincidentally also a common variable to both the original, separate factor graphs 300 and 500. However, merger of the separate factor graphs using the uplifted variable as a merger point between the two factor graphs is not necessary to achieve the benefit of this solution. For example, if the User Preferences factor 622 was not dependent on the Provider Name variable 624 (which might be the case if the user's preference for a given service provider was not recorded), the solution of the merged factor graph 600 for the Provider Name variable 624 would still yield the same benefits.

The definition of the factor graphs 300, 400, 500 and 600 and the solution for the Provider Name variable 624 (or for whatever identifier variable is employed in the merged factor graph 600) may be carried out at a server or other computing device in communication with client or requesting devices. Thus, for example, a number of mobile devices may execute recommendation or search applications that make calls to the server to obtain recommendations or the solved vector for the variable 624.

Continuing with the example of the restaurant service providers, a possible mobile application and back-end server application are illustrated with reference to the example graphical user interfaces of FIGS. 7A through 7D and the flowchart of FIG. 8. FIGS. 7A through 7D illustrate possible screens displayable in a recommender application, which is accessed using a requesting device 100, such as a mobile device. In some example embodiments, the application is installed and executes at the requesting device 100, while in others the requesting device 100 may access a web-based application using another program as a client; for example, a browser application may be used to request web pages and to submit data to a web server to obtain recommendations in accordance with the user's preferences.

FIG. 7A illustrates a first screen 700a displayable at a requesting device 100. In this example, the application provides restaurant recommendations based on selected input received from the requesting device 100. As can be seen in FIG. 7A, input such as a selected cuisine 702 and a location may be provided via the graphical user interface. The location may be determined automatically using geo-positioning systems on board the requesting device 100 (as represented by the input field 704), or may be determined manually through user input (as represented by the input field 706). Other input data may be provided at the requesting device 100 as well, such as a preferred price range, allergy concerns or other dietary restrictions, and the like; any user profile information such as the preferences 302a . . . n identified in connection with FIG. 3, for example, may be provided by way of input.

Whatever input data is received at the requesting device 100 is then transmitted to a server or other computing device that implements programmatic representations of factor graphs, and solves these graph representations. Turning to FIG. 8, at 800 the request is received. The request may include the types of input data identified above, as well as other data such as a user identifier or requesting device identifier, address or other similar data. The request may be transmitted as an HTTP POST request, for example, in which case sufficient identifying information may be included in the sending address received with the HTTP request. However, since the server will also access a user profile in order to determine the recommendations, the request will typically include a user identifier. In addition, the request received may also indicate whether the input provided at the server is provided in order to obtain a recommendation (i.e., a query), or whether it is provided as feedback to revise the user profile used to compute recommendations.

At 810, after receipt of the request, it is determined whether the request received from the requesting device does in fact include a query or is simply a submission of feedback data to further refine the user profile. If the request is a query, then at 850 the query data (i.e., the input data described above) is extracted from the received request. At 855, the appropriate factor graphs for the user identified in the request and for the second set of entities referenced by the request (e.g., the factor graphs 300 and 500) are loaded. The factor graph representations in the accompanying figures are graphical representations for ease of reference; at the server, the factors included in the factor graphs may be stored in an appropriate data format (e.g. in a serialized format, or alternatively in arrays representing probability distributions that are associated with the various characteristics defined for each of the first and second sets of entities). The factor graph representations may be stored at the server, or in a database or other data repository accessible to the server. For ease in updating factors in view of received feedback, described below, the individual factors are stored discretely, and their interrelationships (as reflected by the variables connecting the different factors) are also stored. The factors are merged as described above. It will be appreciated by those skilled in the art that the merging can be accomplished during execution of the message-passing algorithm or other solution method for deriving a probability vector for the target variable that is being solved.

At 860, an inference engine is invoked at the server to solve for the variable representing the identities of the second set of entities (e.g., the Provider Name variable 624). The inference engine makes use of any variable values that are provided in the request, if any, in computing the probability vector for the identity variable. The provided values may be reflect current observations at the device or at the server, which may be user input (e.g., the observation that the user has selected a particular cuisine type), sensor data (e.g., a current geographic location of the user's mobile device), and/or environmental data (e.g., the current time of day, and so forth). This result is obtained at 865, at which point the server may then identify those ones of the second set of entities corresponding to the higher values in the solved vector—for example, those entities having the highest values (e.g., the highest ten or twenty values), or only those values equal to or above a threshold value, such as 70%. The identities are retrieved, along with any other salient information (such as contact information), and returned in a response to the requesting device 100 at 870. A resultant screen 700b is illustrated in FIG. 7B, in which a set of restaurants 710, 711, 712, 713 is provided with associated indicia, such as ratings, links to map data, and links to telephone numbers, as represented by the graphic elements 719, 717 and 715 respectively. As contemplated in the examples illustrated herein, the recommender service is implemented at an electronic device such as a server, which stores the factor graph representations for the first and second sets of entities (the users and the service providers) in memory in the system, and which may include a plurality of processors and a communications subsystem for communicating with the requesting device. The server receives a request from the requesting device, which may be an electronic device such as a mobile communication device. However, the requesting device itself may possess sufficient computing power to execute the message passing algorithm required to solve for the identity variable, in which case the method described above may be carried out at the requesting device.

The user profile factors represented in the factor graph 300 are typically derived from the user's own preferences, which may be collected in advance (as other domain knowledge and public knowledge is collected in order to construct the factor graphs 400 and 500, as described above). In some example embodiments, no data concerning the user's preferences may be collected in advance at all. Rather, as the user interacts with the recommender application and provides feedback, either one of the user profile factors or domain knowledge factors may be revised and enhanced. FIGS. 7C and 7D illustrate possible screens that may be used to collect feedback from a user of the recommender application in order to refine the user profile. FIG. 7C illustrates a first screen 700*c* in which one of the second entities represented by the factor graph 500 or 600 (i.e., a restaurant in this example) is selected using one of a number of possible input fields 720 (selection of a restaurant from a previous request), 722 (selection of a restaurant that the user has visited in the past, which may be stored at the requesting device 100 or at the server), and 724 (identification of a restaurant based on the user's current location). Upon selection of the appropriate restaurant, a review input screen 700*d* (shown in FIG. 7D) is invoked using a submit user interface element 726. Turning to FIG. 7D, the user may then enter ratings 730, provide an opinion regarding the restaurant's cuisine 732 and 734, then submit this data to the server upon actuation of the submit user interface element 736. The data would thus include the ratings and other data input by the user, as well as a user identifier and a restaurant identifier. It may also be noted that the selection alone by the user of a particular restaurant may itself be used to update the domain knowledge or published knowledge factors of the factor graph representing the service provider. For example, if the user profile indicates that the user is probably vegetarian and the user is reported by feedback data as visiting a particular restaurant repeatedly, the factor representing the probability that the restaurant and/or its cuisine is vegetarian may be adjusted to increase that probability.

Figure 8:
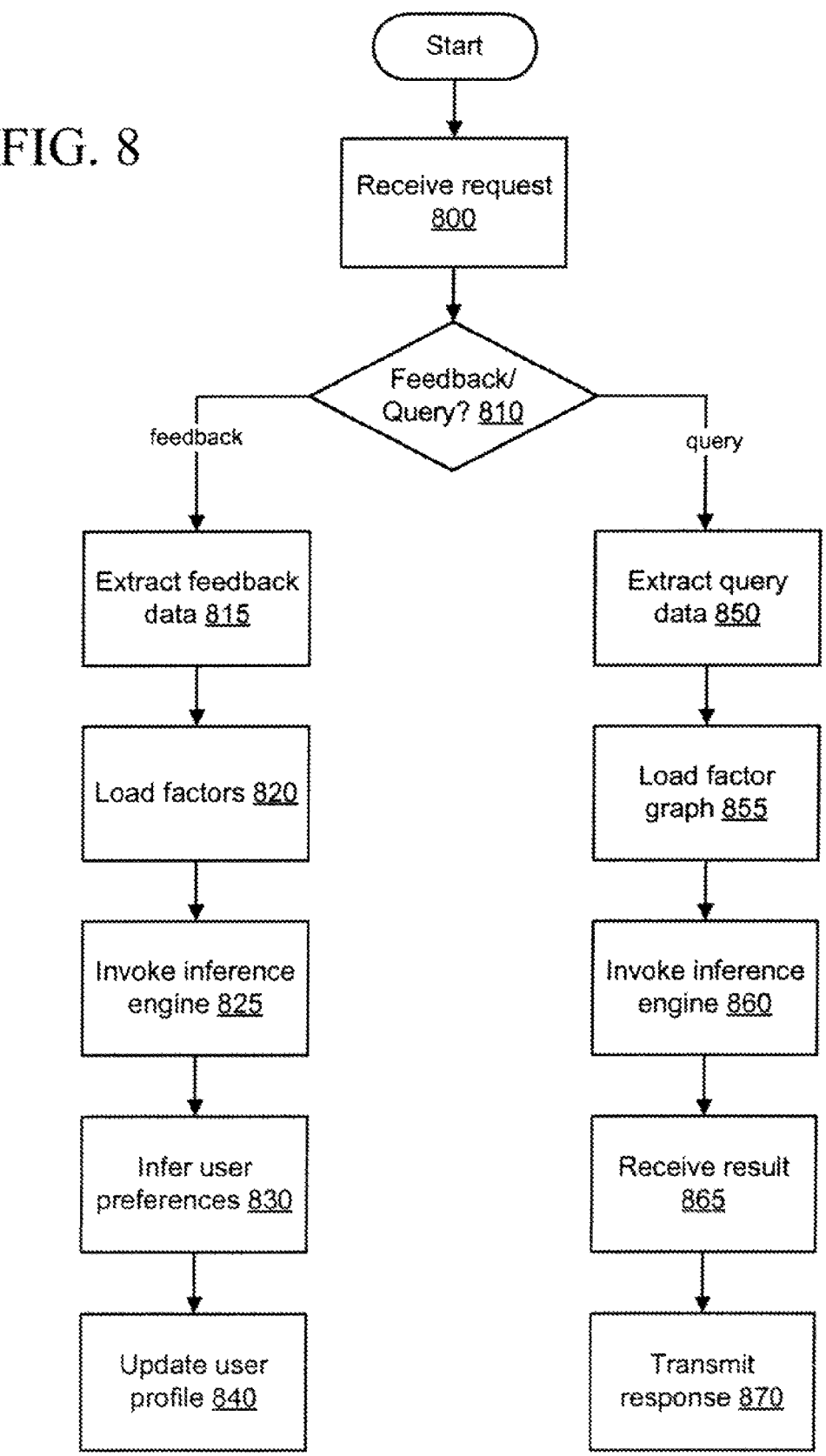
FIG. 8 is a flowchart illustrating a method for executing feedback and query functions at a recommender service.

A method for handling such feedback is also illustrated in FIG. 8. At 810, if it is determined that the request received at the server is to provide feedback, at 815 the feedback data is extracted from the query and the appropriate factors, or the entire factor graph, are loaded at 820. It is not necessary to load the entire factor graph in the feedback data received relates only to one factor; for example, if the feedback received is the user rating for a selected restaurant, then only the factors connected to the User Rating variable 620 and the Provider Name variable 624 for that user need be retrieved—in this case, only the User Preferences factor 622. The inference engine is then invoked at 825, and based on the feedback values received for the User Rating variable 620 and Provider Name variable 624, new values for the User Preferences factor 622 are inferred at 830, reflecting the newly received information. At 840, the updated factor is stored, thus updating the corresponding user profile. Similarly, if feedback is received that can be applied to any other portion of a factor graph, which can include domain knowledge factors (such as 606*a* . . . 606*n*) or public knowledge (such as factors 610*a* . . . 610*n*), only those factors of the appropriate factor graph need be retrieved and adjusted. Again, in some example embodiments the feedback handling method may be executed at the requesting device instead.

Figure 9:
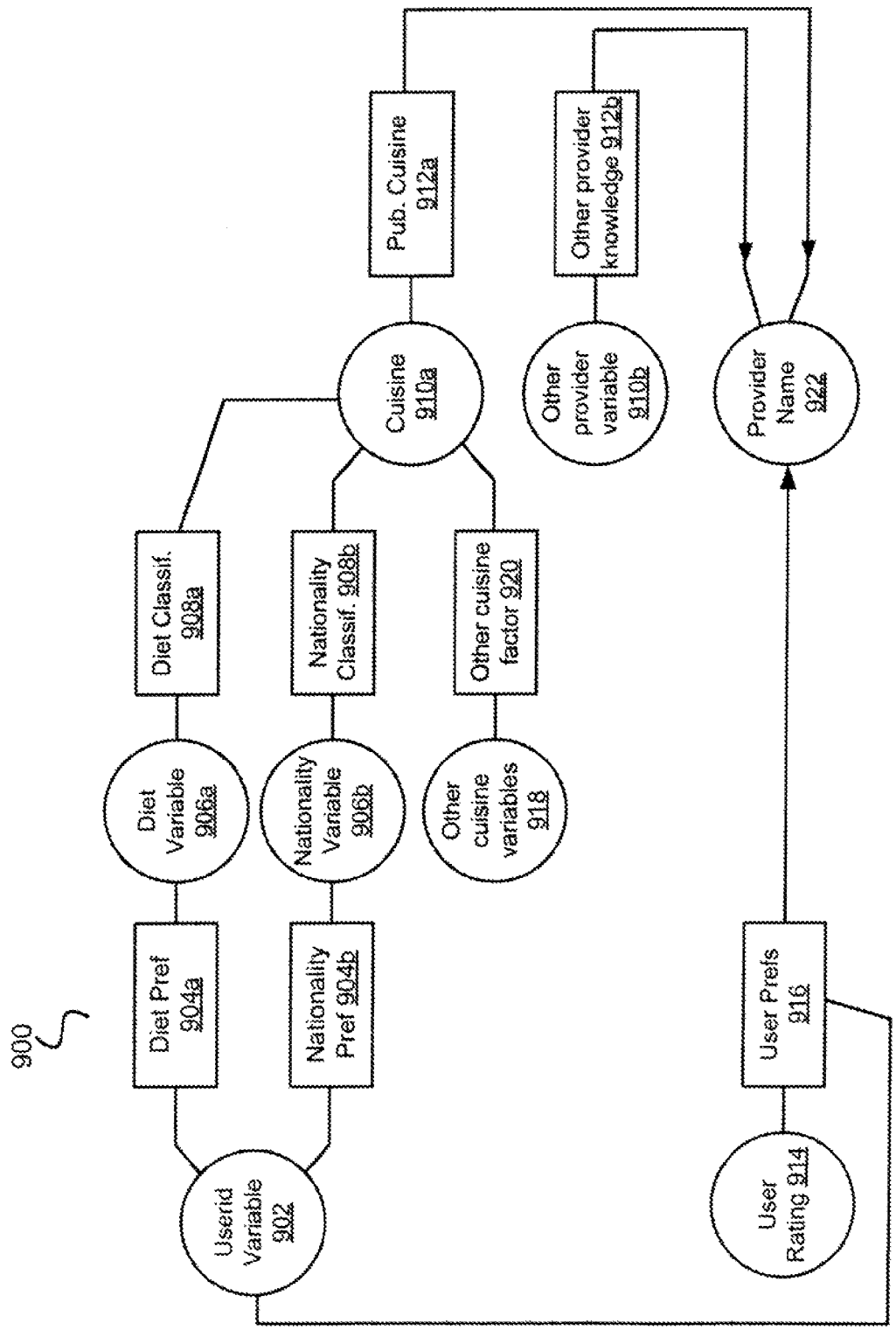
FIG. 9 is a further example of a merged factor graph representing multiple users.

The foregoing example reflects the scenario where there is only one requesting entity in the first set of entities, while the second set of entities includes a number of service providers. The foregoing solution can be implemented in a scenario where the first set of entities includes multiple entities, such as a group of users wishing to receive a service provider recommendation. An example of a factor graph representing this other scenario is illustrated in FIG. 9. The factor graph 900 is similar to the merged factor graph 600 of FIG. 6, and illustrates that diet and cuisine nationality preference factors 904*a*, 904*b*—both of which can be considered to be user profile factors—are connected to corresponding Diet and Nationality variables 906*a*, 906*b*. These two variables, as well as other cuisine-related variables 918, are further connected to domain knowledge factors 908*a*, 908*b* pertaining to the classification of cuisine types according to diet and nationality, and to other domain knowledge factors pertaining to cuisine 920. These factors can be considered to be similar to the domain knowledge factors 606*a* . . . 606*n*, 614 and 618 of FIG. 6. These domain knowledge factors 908*a*, 908*b*, 920 are in turn connected to a Cuisine variable 910*a*, which is also connected to a public knowledge factor 912*a* relating to the published cuisine type of a given service provider. This factor 912*a* is in turn connected to the service provider name variable 922. Other published knowledge factors 912*b*, which are connected to other service provider variables 910*b*, are also connected to the Provider Name variable 922. The Published Cuisine factor 912*a* and Other Provider Knowledge factor 912*b* are thus analogous to the published knowledge factors 610*a* . . . 610*n* of FIG. 6. Also similar to FIG. 6, the Provider Name variable 922 is connected to a User Preferences factor 916, which in turn is also connected to a User Rating variable 914. The factor graph 900 thus represents a merging of published and domain knowledge with user profile factors in a manner similar to the merged factor graph 600 of FIG. 6.

In this example, however, the profiles of multiple users are represented by the Userid variable 902. This variable is an identification variable that can take on values identifying any one of a group of users within the first set of entities. Since this variable 902 is connected to the Diet and Nationality Preference factors 904*a*, 904*b*, these factors—which originally would have been singleton or vector factors, similar to the cuisine type variables 604*a* . . . 604*n* in FIG. 6—are therefore uplifted to matrices. These factors 904*a*, 904*b* include a number of rows, each row representing one of the users of the first set of entities. The Userid variable 902 is also connected to any other factors in the factor graph 900 representing user profile information. Thus, the Userid variable 902 is therefore connected to the User Preferences factor 916, which is therefore also uplifted. The User Preferences factor 622 in FIG. 6 was previously a matrix representing the correlation between a user's ratings and the provider name. In FIG. 9, this factor (now numbered 916) is uplifted to include an additional dimension to reflect each user that is identifiable by the Userid variable 902. The merged factor graph 900 may then be used in a similar manner to the merged factor graph 600 above to derive a probability vector representing the solution for the Provider Name variable 922.

Figures 10, 11:
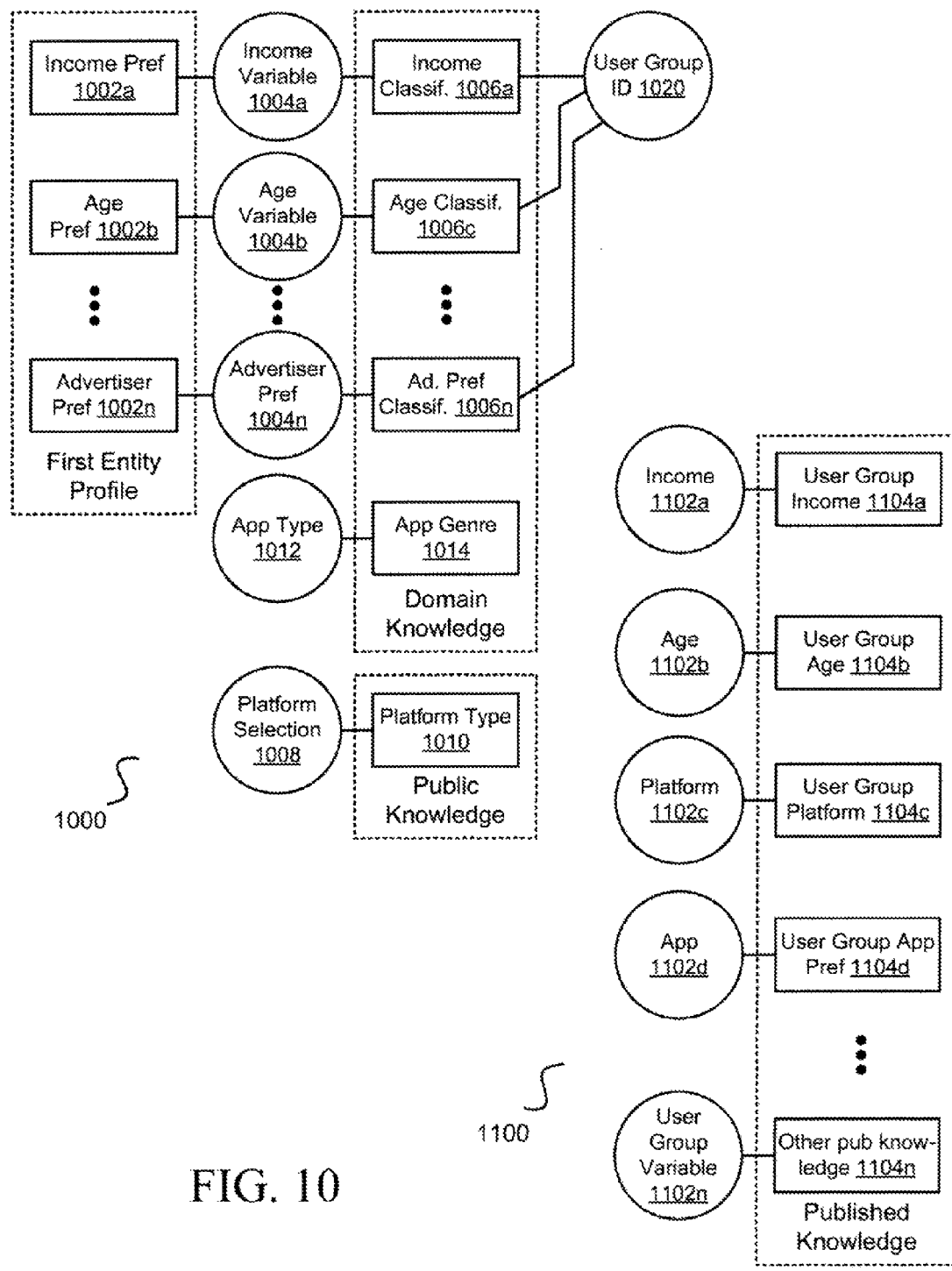
FIG. 10 is a further example of a factor graph representing a further possible service provider profile.
FIG. 11 is a further example of a factor graph representing a further possible user profile.
Figure 12:
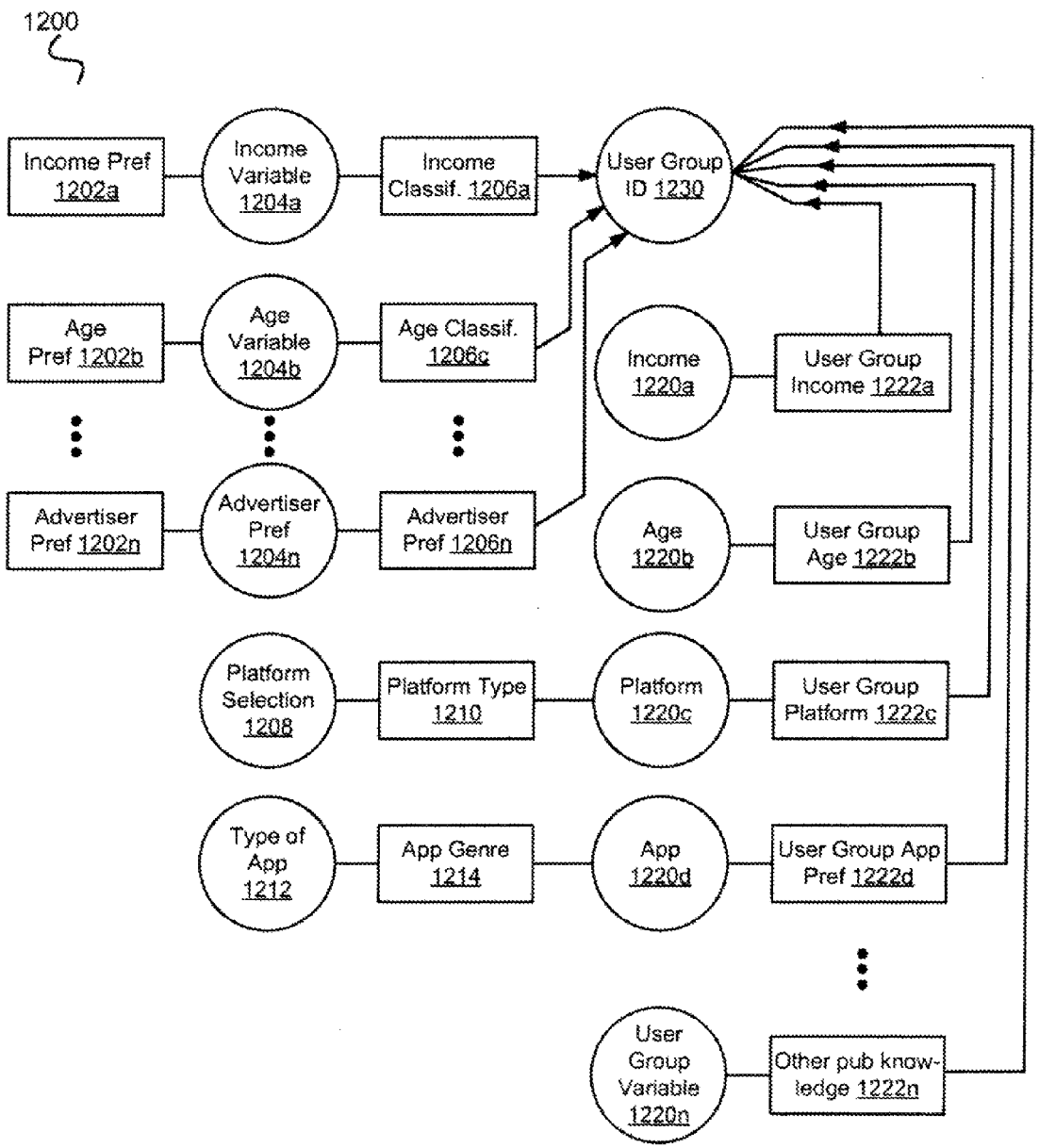
FIG. 12 is a further example of a merged factor graph of the factor graph of FIG. 9 and the factor graph of FIG. 11 uplifted by one dimension.

A further example of factor graphs used to represent a correlation between a first set of entities and second set of entities is illustrated in FIGS. 10 through 12. This example illustrates a corollary to the "recommender" example embodiment of FIGS. 3 through 9; while in the earlier example embodiment the first entity—a single user (or group of individual users)—sought a recommendation of one or more entities from the second set of entities—the service providers from a set of service providers—based on user-related profile information and service provider-related domain and published knowledge, in FIGS. 10 to 12, the first entity, which may be a service provider, seeks a match with one or more entities of a second group of entities to whom to direct advertisements. For the purposes of illustration, the context in FIGS. 10 to 12 is that of an advertiser of a product or service (a mobile computing application available for purchase and download to a wireless mobile computing device) wishing to identify at least one user group to whom advertisements should be directed. The delivery of such advertisements may be accomplished using existing advertising ecosystem architectures, and the advertiser in such case may be the distributer o the mobile computing application itself, a mediation service, or purchaser of advertising services.

Thus, in this example, the factor graph 1000 shown in FIG. 10 represents a generic advertiser entity (the first entity). The factor graph 1000 includes user profile factors $1002a \ldots n$ representing preferences of the first entity, such as the preferred income range desired for the target user group, age preference, and other preferences. These factors $1002a \ldots n$ are connected to corresponding variables $100a \ldots n$, which represent possible values for income 1004a, age 1004b, and other preferences 1004n. These variables in turn are connected to domain knowledge factors $1006a \ldots n$ that reflect the correlation of a given user group, represented by the User Group ID variable 1020, to a given income, age, or other preference classification. In addition, a further domain knowledge factor 1014, reflecting the correlation of a given application to a genre of application (e.g., productivity, game, messaging, and so forth) is connected to an Application Type variable 1012. The first entity factor graph 1000 also includes a public knowledge Platform Type factor 1010, which correlates a given application to a type of platform (e.g., operating system, type of mobile device, or a combination of the two). The Platform Type factor 1010 is dependent on at least a Platform Selection variable 1008 which takes on values representing each platform type. In some example embodiments, the Platform Type factor 1010 can be dependent on a plurality of variables, such as an operating system variable and device type variable, and even on version or model variables.

FIG. 11 illustrates a factor graph 1100 for a generic user group, i.e., an entity of the second group of entities. Each user group is a representation of a collection of individual users, defined as a group (for example, by a telecommunications service provider, who might divide its subscribers into groups according to device type or demographic information). Each user group is defined by published knowledge pertaining to demographic or other factors $1104a \ldots n$ such as income or age range, platform type, and application genre preferences. These factors $1104a \ldots n$ are dependent on corresponding variables $1102a \ldots n$ that identify the specific income, age, platform type, individual application identifier, and so on. In this example, these factors are considered to be published knowledge because the user groups may have been expressly defined according to one or more of these factors. However, the information might instead be derived based on domain expertise, and one or more of these factors may more properly be considered to be domain knowledge. Further, in this example, each user group represents a number of individual users. In another example embodiment, this factor graph may be constructed to represent a generic user by uplifting the factors in the graph by an additional dimension by adding a dependency on an individual user identifier variable, in a manner similar to that described with reference to FIG. 9.

The merged factor graph 1200 resulting from the factor graphs 1000 and 1100 is illustrated in FIG. 12, which reflects the common dependencies of the domain knowledge factors $1206a \ldots n$ from the first entity profile and the published knowledge factors $1222a \ldots n$ from the second entity profile on the User Group ID variable 1230. The factors of the second entity's factor graph 1100 have thus been uplifted to an additional dimension. The Platform Type and Application Genre factors 1210, 1214 of the first entity's factor graph are now also dependent on the Platform Type and Application identifier variables 1220c, 1220d respectively. Given inputs for a subset of the variables reflected in the factor graph 1200 (for example, by specifying values for the variables $1204a \ldots n$, 1208, 1212), the graph 1200 can then be solved for the variable User Group ID 1230, thus producing a converged belief vector, which represents the probability (belief) values corresponding to each user group.

Figure 13:
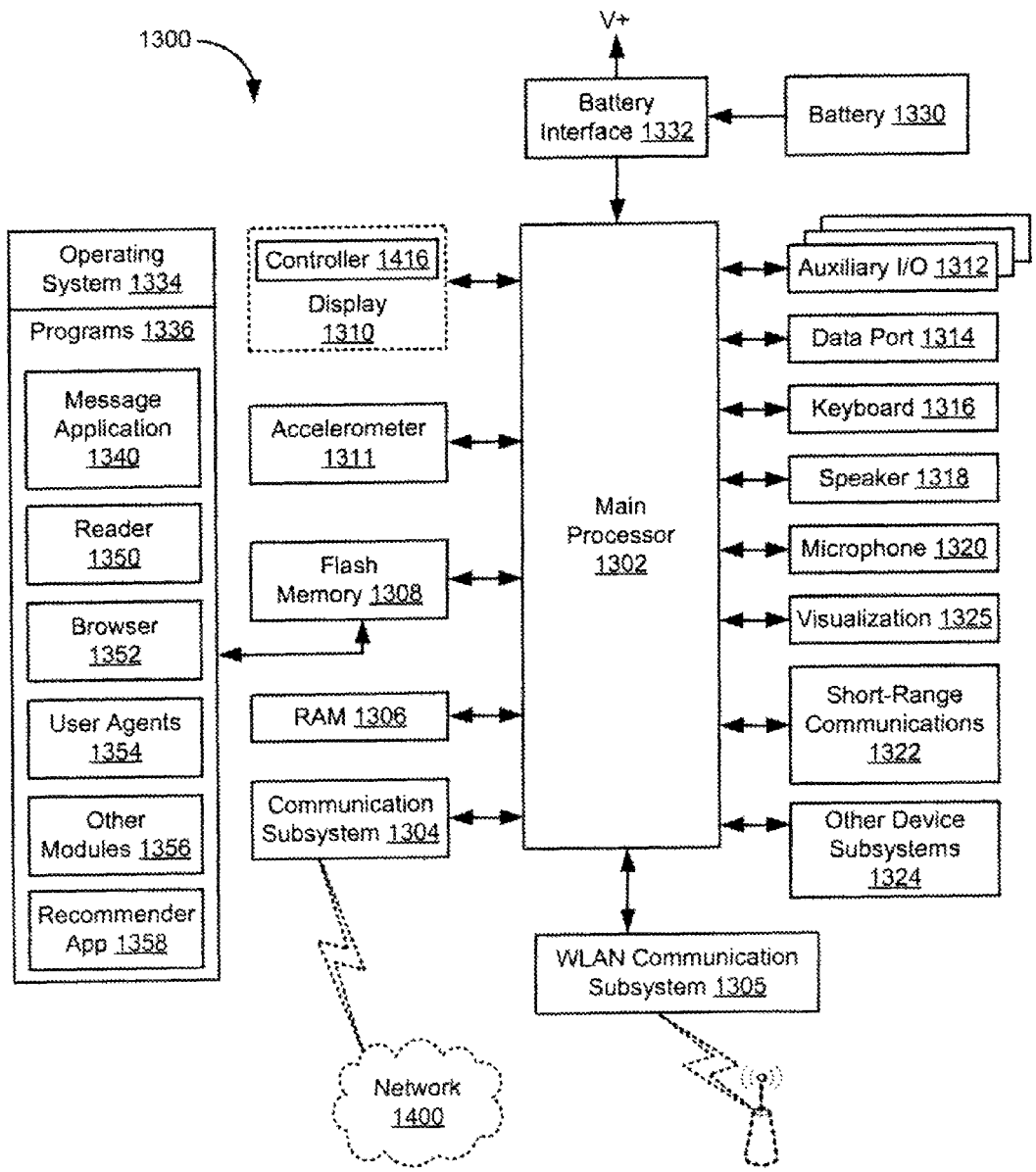
FIG. 13 is a block diagram of an example embodiment of an electronic device for use with the example embodiments of FIGS. 1 to 12.

FIG. 13 is a block diagram of an example embodiment of an electronic device 1300, such as a communication device, that may be used with the example embodiments described herein. The electronic device 1300 includes a number of components such as a main processor 1302 that controls the overall operation of the electronic device 1300. It should be understood that the components described in FIG. 13 are optional and that an electronic device used with various example embodiments described herein may include or omit components described in relation to FIG. 13.

Communication functions, including data and voice communications, are performed through one or more communication subsystems 1304, 1305, and/or 1322 in communication with the processor 1302. Data received by the electronic device 1300 can be decompressed and decrypted by decoder 1303, operating according to any suitable decompression techniques, and encryption/decryption techniques according to one or more various encryption or compression standards known to persons of skill in the art.

If equipped with a communication subsystem 1304, this subsystem 1304 receives data from and sends data to wireless network 1400. In this example embodiment of the electronic device 1300, the communication subsystem 1304 is configured in accordance with one or more wireless communications standards. New wireless communications standards are still being defined, but it is believed that they will have similarities to the network behaviour described herein, and it will also be understood by persons skilled in the art that the example embodiments described herein are intended to use any other suitable standards that are developed in the future. The wireless link connecting the communication subsystem 1304 with the wireless network 1400 represents one or more different Radio Frequency (RF) channels, operating according to defined protocols specified for the wireless communications standard, and optionally other network communications.

The electronic device 1300 may be provided with other communication subsystems, such as a wireless LAN (WLAN) communication subsystem 1305 or a short-range and/or near-field communications subsystem 1322 also shown in FIG. 13. The WLAN communication subsystem 1305 may operate in accordance with a known network protocol such as one or more of the 802.11™ family of standards developed or maintained by IEEE. The communications subsystems 1305 and 1322 provide for communication between the electronic device 1300 and different systems or devices without the use of the wireless network 1400, over varying distances that may be less than the distance over which the communication subsystem 1304 can communicate with the wireless network 1400. The subsystem 1322 can include an infrared device and associated circuits and/or other components for short-range or near-field communication.

It should be understood that any of the communication subsystems 1304, 1305, 1322 may optionally be included in the electronic device 1300. Alternatively, a communication subsystem included in a dongle or other peripheral device (not shown) may be connected to the electronic device 1300, either wirelessly or by a fixed connection such as a USB port, to provide the electronic device 1300 with access to a network. If provided onboard the electronic device 1300, the communication subsystems 1304, 1305 and 1322 may be separate from, or integrated with, each other.

The main processor 1302 also interacts with additional subsystems, if present, such as a Random Access Memory (RAM) 1306, a flash memory 1308, a display 1310, other data and memory access interfaces such as an auxiliary input/output (I/O) subsystem 1312 or a data port 1314, a keyboard 1316, a speaker 1318, a microphone 1320, the communications 1304, 1305, 1322 and other device subsystems 1324. The communication device may also be provided with an accelerometer 1311, which may be used to detect gravity- or motion-induced forces and their direction. Detection of such forces applied to the electronic device 1300 may be processed to determine a response of the electronic device 1300, such as an orientation of a graphical user interface displayed on the display assembly 1310 in response to a determination of the current orientation of the electronic device 1300. The electronic device 1300 may be a battery-powered device including a battery interface 132 for receiving one or more rechargeable batteries 130.

In some example embodiments, the electronic device 1300 may include a touchscreen-based device, in which the display interface 1310 is a touchscreen interface that provides both a display for communicating information and presenting graphical user interfaces, as well as an input subsystem for detecting user input that may be converted to instructions for execution by the device 1300. The touchscreen display interface 1310 may be the principal user interface provided on the electronic device 1300, although in some example embodiments, additional buttons, variously shown in the figures or a trackpad, or other input means may be provided. If a touchscreen display interface 1310 is provided, then other user input means such as the keyboard 1316 may or may not be present. The controller 1416 and/or the processor 1302 may detect a touch by any suitable contact member on the touch-sensitive display 1310.

A visualization processor or module 1325 may be included in the electronic device 1300. The visualization module 1325 analyzes and processes data for visualization on the display 1310. Data originally prepared for visualization on a large-screen display may require additional processing prior to visualization on a small-screen display. This additional processing may be accomplished by the visualization module 1325. As will be appreciated by those of skill in the art, the visualization module can be implemented in hardware, software, or a combination thereof, and can include a dedicated image processor and associated circuitry, or can be implemented within main processor 1302.

The electronic device 1300 also includes an operating system 1334 and software components 1336 to 1352 which are described in more detail below. The operating system 1334 and the software components 1336 to 1352 that are executed by the main processor 1302 are typically stored in a persistent store such as the flash memory 1308, which can alternatively be a read-only memory (ROM) or similar storage element (not shown). Those skilled in the art will appreciate that portions of the operating system 1334 and the software components 1340 to 1352, such as specific device applications, or parts thereof, can be temporarily loaded into a volatile store such as the RAM 1306. Select other modules 1352 may also be included, such as those described herein. Other software components can also be included, as is well known to those skilled in the art.

A subset of software applications 1336 that control basic device operations may be installed on the electronic device 1300 during its manufacture. Other software applications include a message application 1340 that can be any suitable software program that allows a user of the electronic device 1300 to send and receive electronic messages. Various alternatives exist for the message application 1340 as is well known to those skilled in the art. Messages that have been sent or received by the user are typically stored in the flash memory 1308 of the electronic device 1300 or some other suitable storage element in the electronic device 1300. In at least some example embodiments, some of the sent and received messages can be stored remotely from the device 1300 such as in a data store of an associated host system with which the electronic device 1300 communicates.

Other types of software applications can also be installed on the electronic device 1300, such as feed or content readers 1350, web browsers 1352, other user agents 1354, and other modules 1356 such as a recommender application 1358. These software applications may be supplied by the electronic device manufacturer or operating system provider, or may be third party applications. The additional applications can be loaded onto the electronic device 1300 through at least one of the communications subsystems 1304, 1305, 1322, the auxiliary I/O subsystem 1312, the data port 1314, or any other suitable device subsystem 1324. This flexibility in application installation increases the functionality of the electronic device 1300 and can provide enhanced on-device functions, communication-related functions, or both.

In use, a received signal such as a text message, an e-mail message, or web page download will be processed by the receiving communication subsystem 1304, 1305, 1322 and input to the main processor 1302. The main processor 1302 will then process the received signal for output to the display 1310 or alternatively to the auxiliary I/O subsystem 1312. A subscriber can also compose data items, such as e-mail messages, for example, using the keyboard 1316 in conjunction with the display 1310 and possibly the auxiliary I/O subsystem 1312. The auxiliary subsystem 1312 can include devices such as: a touchscreen, mouse, track ball, infrared fingerprint detector, or a roller wheel with dynamic button pressing capability. The keyboard 1316 may be an alphanumeric keyboard and/or telephone-type keypad. However, other types of keyboards can also be used. A composed item can be transmitted over the wireless network 1400 through the communication subsystem 1304. It will be appreciated that if the display 1310 includes a touchscreen, then the auxiliary subsystem 1312 may still include one or more of the devices identified above.

The communication subsystem component 1304 may include a receiver, transmitter, and associated components such as one or more embedded or internal antenna elements, Local Oscillators (LOs), and a processing module such as a Digital Signal Processor (DSP) in communication with the transmitter and receiver. The particular design of the communication subsystems 1304, 1305, 1322, or other communication subsystem is dependent upon the communication network 1400 with which the electronic device 1300 is intended to operate. Thus, it should be understood that the foregoing description serves only as one example.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or example embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits including custom VLSI circuits or gate arrays; field-programmable gate arrays; programmable array logic; programmable logic devices; commercially available logic chips, transistors, and other such components. Modules implemented as software for execution by a processor or processors may include one or more physical or logical blocks of code that may be organized as one or more of objects, procedures, or functions. The modules need not be physically located together, but may include code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rights holder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method, implemented by at least one processor, comprising:
storing a first factor graph representation of a probability distribution describing at least one first entity and including first factors dependent on one or more of a first set of characteristic variables;
storing a second factor graph representation of a probability distribution describing second entities and including second factors dependent on one or more of a second set of characteristic variables, wherein at least one of the second set corresponds to at least one of the first set, and another one of the second set includes an identifier variable representing values from the second entities; and
after receiving a request including at least one value for at least one of the first set,
solving for an a posteriori probability mass function of the identifier variable, the probability mass function including a set of probability values, using a merged factor graph representation based on the first and second factor graph representations and the at least one value; and
identifying, in response to the request, at least one of the second entities corresponding to a highest one of the set of probability values.

2. The method of claim 1, wherein solving for the a posteriori probability mass function includes executing a message passing algorithm on the merged factor graph representation.

3. The method of claim 1, wherein a plurality of characteristic variables of the second set corresponds to a plurality of characteristic variables of the first set.

4. The method of claim 1, wherein the first factors comprise factors derived from at least one of a user profile and domain knowledge.

5. The method of claim 1, wherein the second factors comprise factors derived from public knowledge of each of the second entities.

6. The method of claim 1, further comprising, after receiving the request, transmitting to a requesting device an identifier for the at least one of the second entities thus identified.

7. The method of claim 1, wherein the at least one of the second entities corresponding to a highest one of the set of probability values thus determined includes one or more of the second entities corresponding to a probability value above a predetermined threshold.

8. The method of claim 1, wherein the first factor graph representation describes a plurality of first entities, and further includes an identifier variable representing values for the plurality of first entities.

9. The method of claim 1, wherein the at least one value is derived from current observation data at a requesting device.

10. The method of claim 9, wherein the current observation data includes at least one of user input, sensor data, and environmental data.

11. The method of claim 1, wherein the at least one first entity includes one or more users, and the second entities include service providers.

12. The method of claim 1, further comprising:
receiving feedback data relating to a selection of one of the second entities the at least one first entity; and
updating at least one of the first factor graph representation and the second factor graph representation using the feedback data.

13. An electronic device, comprising:
a memory;
a communications subsystem; and at least one processor in communication with the memory and the communications subsystem, the at least one processor being configured to:

store a first factor graph representation of a probability distribution describing at least one first entity and including first factors dependent on one or more of a first set of characteristic variables;

store a second factor graph representation of a probability distribution describing second entities and including second factors dependent on one or more of a second set of characteristic variables, wherein at least one of the second set corresponds to at least one of the first set, and another one of the second set includes an identifier variable representing values from the second entities; and after receiving a request including at least one value for at least one of the first set, solve for an a posteriori probability mass function of the identifier variable, the probability mass function including a set of probability values, using a merged factor graph representation based on the first and second factor graph representations and the at least one value; and identify, in response to the request, at least one of the second entities corresponding to a highest one of the set of probability values.

14. The electronic device of claim 13, wherein the at least one processor is configured to solve for the a posteriori probability mass function by executing a message passing algorithm on the merged factor graph representation.

15. The electronic device of claim 13, wherein a plurality of characteristic variables of the second set corresponds to a plurality of characteristic variables of the first set.

16. The electronic device of claim 13, wherein the first factors include factors derived from at least one of a user profile and domain knowledge.

17. The electronic device of claim 13, wherein the second factors include factors derived from public knowledge of each of the second entities.

18. The electronic device of claim 13, wherein the at least one processor is further configured to, in response receiving to the request, transmit via the communications subsystem to a requesting device an identifier for the at least one of the second entities thus identified.

19. The electronic device of claim 13, wherein at least one of the second entities corresponding to a highest one of the set of probability values thus determined includes one or more of the second entities corresponding to a probability value above a predetermined threshold.

20. The electronic device of claim 13, wherein the first factor graph representation describes a plurality of first entities, and further includes an identifier variable representing values for the plurality of first entities.

21. The electronic device of claim 13, wherein the at least one value is derived from current observation data at a requesting device.

22. The electronic device of claim 13, wherein the current observation data includes at least one of user input, sensor data, and environmental data.

23. The electronic device of claim 13, wherein the at least one first entity includes one or more users, and the second entities include service providers.

24. The electronic device of claim 13, wherein the at least one processor is further configured to:

receive via the communications subsystem feedback data relating to a selection of one of the second entities by the at least one first entity; and update at least one of the first factor graph representation and the second factor graph representation using the feedback data.

25. A non-transitory computer-readable medium bearing code which, when executed by at least one processor of a computing device, causes the computing device to:

store a first factor graph representation of a probability distribution describing at least one first entity and including first factors dependent on one or more of a first set of characteristic variables;

store a second factor graph representation of a probability distribution describing second entities and including second factors dependent on one or more of a second set of characteristic variables, wherein at least one of the second set corresponds to at least one of the first set, and another one of the second set includes an identifier variable representing values from the second entities; and after receiving a request including at least one value for at least one of the first set, solving for an a posteriori probability mass function of the identifier variable, the probability mass function including a set of probability values, using a merged factor graph representation based on the first and second factor graph representations and the at least one value; and identifying, in response to the request, at least one of the second entities corresponding to a highest one of the set of probability values.

* * * * *